(12) United States Patent
Komatsu et al.

(10) Patent No.: US 10,323,128 B2
(45) Date of Patent: Jun. 18, 2019

(54) METHOD OF MANUFACTURING ELECTROPHORETIC PARTICLE, ELECTROPHORETIC PARTICLE, ELECTROPHORETIC DISPERSION LIQUID, ELECTROPHORETIC SHEET, ELECTROPHORETIC DEVICE, AND ELECTRONIC APPARATUS

(71) Applicant: E Ink Corporation, Billerica, MA (US)

(72) Inventors: Harunobu Komatsu, Matsumoto (JP);
Hiroki Nakahara, Shiojiri (JP);
Masahiko Nakazawa, Matsumoto (JP);
Takashi Hiraiwa, Fujimi-machi (JP);
Kozo Shitagami, Chino (JP)

(73) Assignee: E Ink Corporation, Billerica, MA (US)

( * ) Notice: Subject to any disclaimer, the term of this patent is extended or adjusted under 35 U.S.C. 154(b) by 232 days.

(21) Appl. No.: 15/365,796

(22) Filed: Nov. 30, 2016

(65) Prior Publication Data

US 2017/0158822 A1 Jun. 8, 2017

(30) Foreign Application Priority Data

Dec. 2, 2015 (JP) .................... 2015-235350

(51) Int. Cl.
*G02F 1/167* (2019.01)
*C08G 77/44* (2006.01)
(Continued)

(52) U.S. Cl.
CPC ........... *C08G 77/44* (2013.01); *C09D 183/10* (2013.01); *G02F 1/167* (2013.01); *C08G 77/442* (2013.01); *G02F 2001/1678* (2013.01)

(58) Field of Classification Search
CPC ............ G02F 1/167; G02F 2001/1678; G02F 1/0018; G02F 1/133348; G02F 1/172;
(Continued)

(56) References Cited

U.S. PATENT DOCUMENTS

| 6,117,368 A * | 9/2000 | Hou ...................... C08F 257/02 252/572 |
| 2003/0097960 A1* | 5/2003 | Ito .......................... C09D 11/30 106/31.58 |

(Continued)

FOREIGN PATENT DOCUMENTS

| JP | 2004-191418 A | 7/2004 |
| JP | 2009-251084 A | 10/2009 |
| JP | 2013-218121 A | 10/2013 |

*Primary Examiner* — William R Alexander
*Assistant Examiner* — Balram T Parbadia
(74) *Attorney, Agent, or Firm* — Antranig Baronian

(57) ABSTRACT

A method of manufacturing an electrophoretic particle is a method of manufacturing an electrophoretic particle including a particle and a particle surface treatment agent which is bonded to the particle, the method including preparing a mixture containing a plurality of the particles, the particle surface treatment agent, an unreacted product of a raw material used at the time of generating the particle surface treatment agent, and a reaction by-product generated at the time of generating the particle surface treatment agent, the mixture having a content of the particle surface treatment agent which is set to be equal to or greater than 70% by weight in the mixture except for the plurality of particles; and bonding the particle surface treatment agent to a surface of the particle in the mixture.

9 Claims, 10 Drawing Sheets

(51) Int. Cl.
 *C09D 183/10* (2006.01)
 *G02F 1/1675* (2019.01)
 *C08G 77/442* (2006.01)

(58) Field of Classification Search
 CPC ........ C08F 257/02; C08F 20/06; C08F 20/34;
         C08F 20/56; C08F 212/08; C09D 11/326;
            C09D 183/10; C09D 11/322; C09D
                                     17/001
 See application file for complete search history.

(56) References Cited

U.S. PATENT DOCUMENTS

| | | | | |
|---|---|---|---|---|
| 2005/0259312 | A1* | 11/2005 | Miyazaki | B01J 13/08 |
| | | | | 359/296 |
| 2005/0267252 | A1* | 12/2005 | Minami | G02F 1/167 |
| | | | | 524/556 |
| 2005/0267263 | A1* | 12/2005 | Minami | C08F 257/02 |
| | | | | 525/242 |
| 2007/0195402 | A1* | 8/2007 | Miyazawa | G02F 1/167 |
| | | | | 359/296 |
| 2009/0251764 | A1 | 10/2009 | Uchiyama et al. | |
| 2010/0002287 | A1* | 1/2010 | Naijo | G02F 1/167 |
| | | | | 359/296 |
| 2011/0281103 | A1* | 11/2011 | Zhou | B82Y 30/00 |
| | | | | 428/323 |
| 2012/0101217 | A1* | 4/2012 | Li | C09D 7/02 |
| | | | | 524/558 |
| 2013/0265632 | A1* | 10/2013 | Aoki | G02F 1/167 |
| | | | | 359/296 |

* cited by examiner

FIG. 6

| X | Y | Z |
|---|---|---|
| —NH$_2$ | epoxide | CH$_3$-NH-CH$_2$-CH(OH)-CH$_2$-CH$_3$ |
| —NH$_2$ | —COOH | CH$_3$-NH-C(=O)-CH$_3$ |
| epoxide | —NH$_2$ | CH$_3$-NH-CH$_2$-CH(OH)-CH$_2$-CH$_3$ |
| —NCO | —OH | CH$_3$-NH-C(=O)-O-CH$_3$ |
| —NCO | —NH$_2$ | CH$_3$-NH-C(=O)-NH-CH$_3$ |
| —SH | epoxide | CH$_3$-S-CH$_2$-CH(OH)-CH$_2$-CH$_3$ |
| —(Si)—H | —C=C—R | CH$_3$-Si-CH$_2$-CH$_2$-CH$_3$ |

METHOD OF MANUFACTURING ELECTROPHORETIC PARTICLE, ELECTROPHORETIC PARTICLE, ELECTROPHORETIC DISPERSION LIQUID, ELECTROPHORETIC SHEET, ELECTROPHORETIC DEVICE, AND ELECTRONIC APPARATUS

BACKGROUND

1. Technical Field

The present invention relates to a method of manufacturing an electrophoretic particle, an electrophoretic particle, an electrophoretic dispersion liquid, an electrophoretic sheet, an electrophoretic device, and an electronic apparatus.

2. Related Art

Generally, the fact that when an electric field is applied to a disperse system in which fine particles are dispersed in a fluid, the fine particles move (migrate) in the fluid by Coulomb's force has been known. This phenomenon is called electrophoresis, and recently, an electrophoretic display device which displays desired information (an image) by using the electrophoresis has attracted attention as a new display device.

Such an electrophoretic display device has display memory properties and wide viewing angle properties in a state of stopping the application of voltage, and is capable of performing high contrast display and low power consumption.

In addition, the electrophoretic display device is a non light-emitting type device, and thus is easy on the eyes as compared with a light-emitting type display device such as a cathode-ray tube.

It has been known that such an electrophoretic display device includes a liquid which disperses the electrophoretic particles in a dispersion medium as the electrophoretic dispersion liquid disposed between a pair of substrates having electrodes.

In the electrophoretic dispersion liquid of the above-described configuration, a positively charged particle and a negatively charged particle are used as the electrophoretic particle, and thus it is possible to display desired information (image) by applying a voltage across a pair of substrates (electrodes).

As the aforementioned electrophoretic particle, typically, a particle having a coated layer in which a polymer (coupling agent) is bonded to a base material particle is used, and with such a configuration of having the coated layer (polymer), it is possible to disperse and charge the electrophoretic particles in the electrophoretic dispersion liquid (refer to JP-A-2004-191418).

In the above-described electrophoretic particle contained in the electrophoretic dispersion liquid, in a case where a coating rate of a polymer with respect to the surface thereof is low, dispersibility in the dispersion liquid is not sufficiently obtained. For this reason, the electrophoretic particle is precipitated, the charge of the electrophoretic particle becomes larger, and thereby positive and negative electrophoretic particles are aggregated with each other and are adhered to the electrode surface. As a result, there is a problem in that degradation of the contrast, change of the contrast with time, and the like are caused.

SUMMARY

An advantage of some aspects of the invention is to provide a method of manufacturing an electrophoretic particle which can manufacture an electrophoretic particle exhibiting excellent contrast in an electrophoretic dispersion liquid, an electrophoretic particle exhibiting excellent contrast in an electrophoretic dispersion liquid, an electrophoretic dispersion liquid, an electrophoretic sheet, an electrophoretic device, and an electronic apparatus which use the electrophoretic particle and thus has high reliability.

Such an advantage can be achieved in the following aspects of the invention.

According to an aspect of the invention, there is provided a method of manufacturing an electrophoretic particle which includes a particle, and a particle surface treatment agent which is boded to the particle, the method including preparing a mixture containing a plurality of the particles, the particle surface treatment agent, an unreacted product of a raw material used at the time of generating the particle surface treatment agent, and a reaction by-product generated at the time of generating the particle surface treatment agent, the mixture having a content of the particle surface treatment agent which is set to be equal to or greater than 70% by weight in the mixture except for the plurality of particles; and bonding the particle surface treatment agent to the particle in the mixture.

With this, in a case where the weight of the particle is set to be 100% by weight, it is possible to obtain an electrophoretic particle having the weight of the particle surface treatment agent in a range of 4% by weight to 8% by weight. Thus, the electrophoretic particle exhibits the excellent contrast in the electrophoretic dispersion liquid.

In the method of manufacturing an electrophoretic particle according to the aspect of the invention, it is preferable that in the preparing of the mixture, a solvent for dissolving the particle surface treatment agent be not added into the mixture.

With this, in a case where the weight of the particle is set to be 100% by weight, it is possible to reliably obtain an electrophoretic particle having the weight of the particle surface treatment agent in a range of 4% by weight to 8% by weight.

In the method of manufacturing an electrophoretic particle according to the aspect of the invention, it is preferable that weight-average molecular weight of each of the unreacted product and the reaction by-product be in a range of 1,000 to 50,000.

In a case where the weight-average molecular weight of the unreacted product and the reaction by-product is within the above-described range, the unreacted product and the reaction by-product are mixed into the mixture.

In the method of manufacturing an electrophoretic particle according to the aspect of the invention, it is preferable that the particle surface treatment agent be a siloxane-based compound.

In a case where the siloxane-based compound is used as the particle surface treatment agent, the unreacted product used at the time of obtaining the siloxane-based compound remains in the mixture.

In the method of manufacturing an electrophoretic particle according to the aspect of the invention, it is preferable that the particle surface treatment agent be a block copolymer which contains a dispersion portion which is formed by polymerizing first monomers and a bonding portion which is formed by polymerizing second monomers having a functional group, and is bonded to the particle when the functional group and a hydroxyl group are reacted with each other in the bonding portion, and the first monomer is a silicone macromonomer expressed by the following Formula (I).

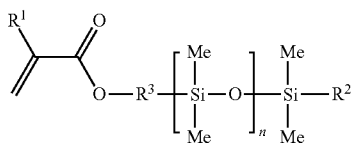

(I)

[In the formula, $R^1$ represents a hydrogen atom or a methyl group, $R^2$ represents a hydrogen atom or an alkyl group having 1 to 4 carbon atoms, $R^3$ represents a structure including one of an alkyl group having 1 to 6 carbon atoms and an ether group of ethylene oxide or propylene oxide, and n represents an integer of 0 or greater.]

In a case where the silicone macromonomer expressed by the above-described Formula (I) is used as the first monomer, the unreacted product used at the time of obtaining the silicone macromonomer expressed by the above-described Formula (I) remains in the mixture.

In the method of manufacturing an electrophoretic particle according to the aspect of the invention, it is preferable that the unreacted product and the reaction by-product be respectively an unreacted product of a raw material at the time of generating the first monomer and a reaction by-product at the time of generating the first monomer.

According to another aspect of the invention, there is provided an electrophoretic particle including a particle; and a particle surface treatment agent which is bonded to the particle, in which when a weight of the particle is set to be 100% by weight, the weight of the particle surface treatment agent is in a range of 4% by weight to 8% by weight.

With this, the electrophoretic particle is sufficiently dispersed in the electrophoretic dispersion liquid, and thus it is possible to reliably suppress or prevent the positive and negative electrophoretic particles from being aggregated with each other and from being adhered to the electrode surface. Therefore, the problem in that degradation of the contrast, change of the contrast with time, and the like are caused can be solved.

According to still another aspect of the invention, there is provided an electrophoretic dispersion liquid including the electrophoretic particle according to the above-described aspects of the invention; and a dispersion medium.

The electrophoretic particle is sufficiently dispersed in the electrophoretic dispersion liquid, and thus it is possible to reliably suppress or prevent the positive and negative electrophoretic particles from being aggregated with each other and from being adhered to the electrode surface. Therefore, the problem in that degradation of the contrast, change of the contrast with time, and the like are caused can be solved.

According to still another aspect of the invention, there is provided an electrophoretic sheet including a substrate; and a structure body which is provided on the substrate, and accommodates the electrophoretic dispersion liquid of the invention.

With this, it is possible to obtain the electrophoretic sheet with high-performance and reliability.

According to still another aspect of the invention, there is provided an electrophoretic device including the electrophoretic sheet of the invention.

With this, it is possible to obtain the electrophoretic device with high-performance and reliability.

According to still another aspect of the invention, there is provided an electronic apparatus including the electrophoretic device of the invention.

With this, it is possible to obtain the electronic apparatus with high-performance and reliability.

BRIEF DESCRIPTION OF THE DRAWINGS

The invention will be described with reference to the accompanying drawings, wherein like numbers reference like elements.

FIG. 6 is a diagram illustrating, regarding a coupling agent and a modified silicone oil which are used to obtain the siloxane-based coupling agent having a structure Z illustrated in FIG. 5, specific examples of a reactive functional group X contained in the coupling agent, and a reactive functional group Y contained in the modified silicone oil.

DESCRIPTION OF EXEMPLARY EMBODIMENTS

Hereinafter, preferable embodiments of a method of manufacturing an electrophoretic particle, an electrophoretic particle, an electrophoretic dispersion liquid, an electrophoretic sheet, an electrophoretic device, and an electronic apparatus of an embodiment of the invention will be specifically described with reference to the drawings.

First, before describing the method of manufacturing an electrophoretic particle of the embodiment of the invention, an electrophoretic dispersion liquid containing an electrophoretic particle (the electrophoretic particle of the embodiment of the invention) which is manufactured by the method of manufacturing an electrophoretic particle of the embodiment of the invention will be described.

Electrophoretic Dispersion Liquid

First Embodiment

The electrophoretic dispersion liquid contains at least one type of electrophoretic particles 1, and a dispersion medium (a liquid phase dispersion medium), and in the electrophoretic dispersion liquid, the electrophoretic particles 1 are dispersed (suspended) in the dispersion medium.

First, the electrophoretic particles 1 contained in the electrophoretic dispersion liquid will be described.

Electrophoretic Particle

Figure 1:
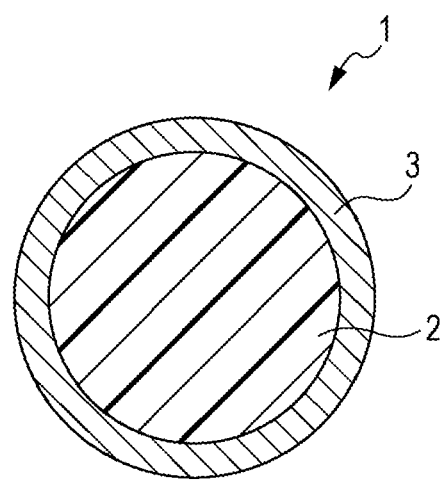
FIG. 1 is a longitudinal sectional view illustrating an electrophoretic particle contained in an electrophoretic dispersion liquid according to a first embodiment of the invention.
Figure 2:
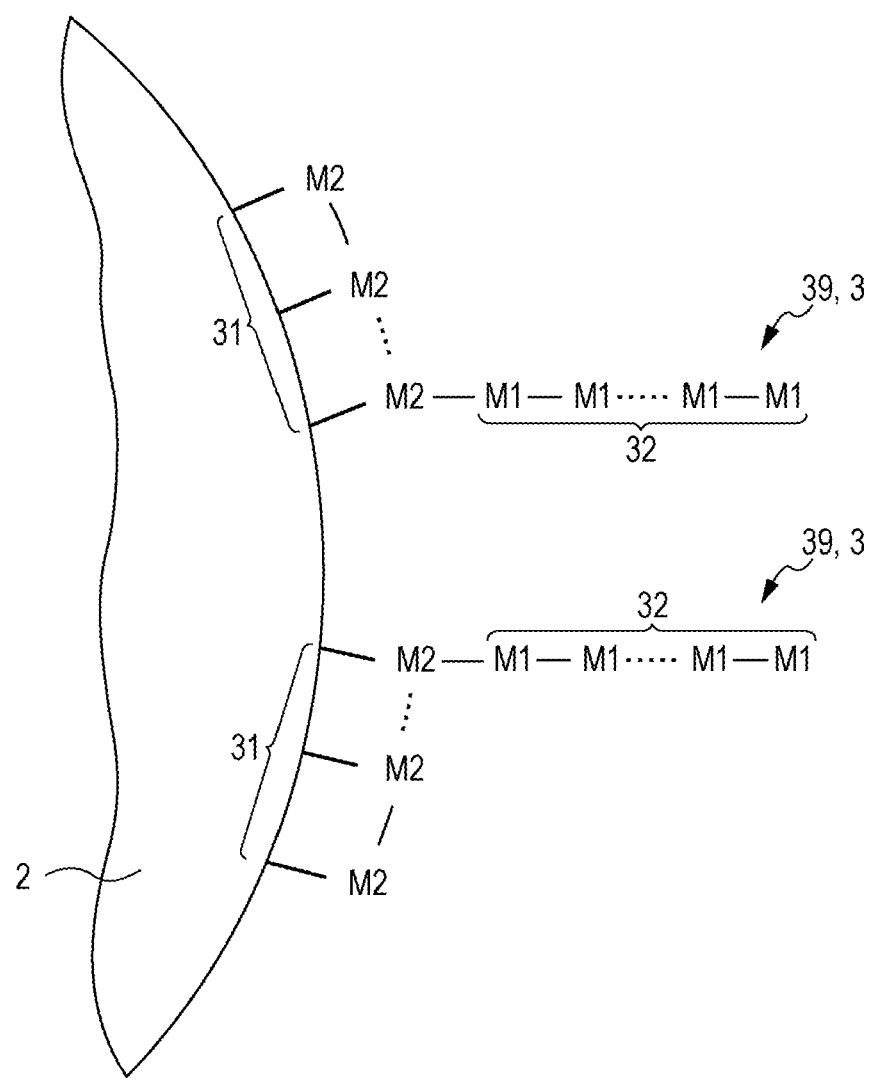
FIG. 2 is a schematic diagram of a block copolymer contained in the electrophoretic particle illustrated in FIG. 1.

FIG. 1 is a longitudinal sectional view illustrating a first embodiment of the electrophoretic particle contained in an electrophoretic dispersion liquid of the embodiment of the invention, and FIG. 2 is a schematic diagram of a block copolymer contained in the electrophoretic particle illustrated in FIG. 1.

As illustrated in FIG. 1, the electrophoretic particle 1 includes a base particle (particle) 2 and a coated layer 3 provided on a surface of the base particle 2.

As the base particle 2, for example, at least one of a pigment particle, a resin particle, and a composite particle thereof is preferably used. These particles are easily manufactured.

Examples of the pigment for constituting the pigment particle include a black pigment such as aniline black, carbon black, and titanium black, a white pigment such as titanium dioxide, antimony trioxide, barium sulfate, zinc sulfide, zinc oxide, and silicon dioxide, an azo-based pigment such as monoazo, disazo, and polyazo, a yellow pigment such as isoindolinone, chrome yellow, yellow iron oxide, cadmium yellow, titanium yellow, and antimony, a red pigment such as quinacridone red and chrome vermilion, a blue pigment such as phthalocyanine blue, indanthrene blue, Prussian blue, ultramarine blue, and cobalt blue, and a green pigment such as phthalocyanine green. These pigments may be used alone or in combination of two or more types thereof.

In addition, examples of a resin material for constituting resin particles include an acrylic resin, a urethane resin, a urea resin, an epoxy resin, polystyrene, and polyester. These resins may be used alone or in combination of two or more types thereof.

In addition, examples of the composite particle include a particle obtained by performing a coating treatment in which the surface of the pigment particle is coated with the resin material, a particle obtained by performing a coating treatment in which the surface of the resin particle is coated with the pigment, and a particle composed of a mixture obtained by mixing the pigment and the resin material at an appropriate composition ratio.

Meanwhile, it is possible to set a desired color for the electrophoretic particle 1 by appropriately selecting the type of the pigment particle, the resin particle, and the composite particle which are used as the base particle 2.

In addition, due to the above selection, the positive charging properties or the negative charging properties of the base particle 2, and the charging amount thereof can be set as a unique matter of the base particle 2.

Note that, it is necessary that the base particle 2 includes (exposes) a first functional group which can be bonded to (react with) a second functional group included in a bonding portion 31 of a block copolymer 39 described below on the surface thereof. However, there is a case where the base particle 2 does not include a functional group depending on the type of the pigment particle, the resin particle, and the composite particle, and thus, in this case, the first functional group is introduced to the surface of the base particle 2 by performing in advance a functional group introduction treatment such as an acid treatment, a base treatment, a UV treatment, an ozone treatment, and a plasma treatment.

Meanwhile, the combination of the first functional group which is provided on the surface of the base particle 2, and the second functional group which includes the bonding portion 31 of the block copolymer 39 is not particularly limited as long as the materials can be bonded to each other through the reaction therebetween. For example, examples of the combination include a combination of an isocyanate group and a hydroxyl group or an amino group, a combination of an epoxy group, a glycidyl group or an oxetane group and a carboxyl group, an amino group, a thiol group, and a hydroxyl group or an imidazole group, a combination of an amino group and a halogen group such as Cl, Br, and I, and a combination of an alkoxysilyl group and a hydroxyl group or an alkoxysilyl group. Among them, a combination of the hydroxyl group as the first functional group and the alkoxysilyl group as the second functional group is preferably used.

Both of the base particle 2 having the above combination and a monomer M2 can be relatively easily prepared, and are preferably used since the monomer M2 (a block copolymer described below) can be firmly bonded onto the surface of the base particle 2.

Hereinafter, an example of a combination of the first functional group which is provided on the surface of the base particle 2 as a hydroxyl group with the second functional group provided in the monomer M2 as an alkoxysilyl group will be described.

In the base particle 2, at least a portion (almost the entire surface in the configuration in the drawing) of the surface thereof is coated with the coated layer 3.

The coated layer 3 is configured to include a plurality of the block copolymers 39 (hereinafter, simply referred to as a "polymer 39") (refer to FIG. 2).

The block copolymer 39 includes a dispersion portion 32 and the bonding portion 31 which is bonded to the dispersion portion 32, and the dispersion portion 32 is formed by polymerizing first monomers M1 (hereinafter, simply referred to as a "monomer M1") having a portion (a group) for contributing to the dispersibility in the dispersion medium, and includes a plurality of units (constituting units, hereinafter, referred to as a dispersion unit) derived from the monomer M1. The bonding portion 31 is formed by polymerizing second monomers M2 of which have an alkoxysilyl group (the second functional group) and is reacted with a hydroxyl group (the first functional group) on the surface of the base particle, and includes a plurality of units (hereinafter, referred to as a "bonding unit") derived from the monomers M2. In the bonding portion 31, when the hydroxyl group and the functional group are reacted with each other, the base particle 2 and the block copolymer 39 are chemically bonded.

In the embodiment, the aforementioned block copolymer 39 forms a particle surface treatment agent (coupling agent) which is used to form the electrophoretic particle 1.

Hereinafter, the dispersion portion 32 and the bonding portion 31 which form the aforementioned block copolymer 39 will be described below.

The dispersion portion 32 is provided on the surface of the base particle 2 in the coated layer 3 so as to impart the dispersibility to the electrophoretic particle 1 in the electrophoretic dispersion liquid.

In the electrophoretic dispersion liquid, the aforementioned dispersion portion 32 is formed by polymerizing the plurality of monomers M1 which include a portion that becomes a side chain for contributing to the dispersibility in the dispersion medium after being polymerized, and includes the plurality of dispersion units derived from the monomers M1, which are bonded to each other.

Each of the monomers M1 has one polymerizable group such that the monomers M1 are polymerized by the living radical polymerization (the radical polymerization), and is a pendant-type monofunctional monomer which includes a portion corresponding to a non-ionic side chain after performing polymerization.

In the embodiment, a silicone macromonomer expressed by the following Formula (I) which has dimethyl polysiloxane as the non-ionic side chain, and a (meth)acryloyl group as the polymerizable group is used as the monomer M1. In a case where such a silicone macromonomer is used as the monomer M1, the block copolymer 39 has a function as a siloxane-based compound.

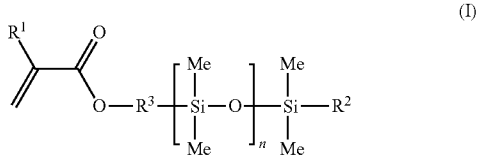

(I)

[In the formula, $R^1$ represents a hydrogen atom or a methyl group, $R^2$ represents a hydrogen atom or an alkyl group having 1 to 4 carbon atoms, $R^3$ represents a structure including one of an alkyl group having 1 to 6 carbon atoms and an ether group of ethylene oxide or propylene oxide, and n represents an integer of 0 or greater.]

When the silicone macromonomer having such a non-ionic side chain is used as the monomer M1, the dispersion portion 32 which is formed by the living radical polymerization exhibits excellent affinity with respect to a silicone oil used as a dispersion medium which is included in the electrophoretic dispersion liquid described below. For this reason, the electrophoretic particles 1 which include the dispersion portion 32 are dispersed with excellent dispersibility in the electrophoretic dispersion liquid without being aggregated. In addition, when the monomer M1 having the (meth)acryloyl group as the polymerizable group is used, the monomers M1 can be polymerized with each other with excellent reactivity, and thus it is possible to easily obtain the dispersion portion 32.

The weight-average molecular weight of the silicone macromonomer expressed by Formula (I) above as the monomer M1 is preferably in a range of approximately 1,000 to 50,000, is further preferably in a range of approximately 3,000 to 30,000, and is still further preferably in a range of approximately 5,000 to 20,000. With this, it is possible to disperse the electrophoretic particles 1 which include the dispersion portion 32 obtained by polymerizing the monomers M1 in the dispersion medium with further excellent dispersibility.

In addition, the weight-average molecular weight of the dispersion portion 32 is not particularly limited, but is preferably in a range of 8,000 to 50,000, and is further preferably in a range of 10,000 to 35,000. With this, it is possible to make the dispersibility of the electrophoretic particle 1 in the electrophoretic dispersion liquid further excellent.

Further, in one polymer, the number of the dispersion units included in the dispersion portion 32 is preferably in a range of 1 to 20, and is further preferably in a range of 1 to 5. With this, it is possible to reliably impart the dispersibility of the electrophoretic particle 1 in the electrophoretic dispersion liquid.

In addition, the molecular weight distribution of the dispersion portion 32 is preferably equal to or lower than 1.2, is further preferably equal to or lower than 1.1, and is still further preferably equal to or lower than 1.05.

Here, the molecular weight distribution of the dispersion portion 32 represents the ratio (Mw/Mn) of the number average molecular weight (Mn) of the dispersion portion 32 to the weight-average molecular weight (Mw) of the dispersion portion 32, and it can be said that when the molecular weight distribution of the dispersion portion 32 is within the above-described range, the dispersion portions 32 which are exposed in the plurality of electrophoretic particles 1 have almost the same length. For this reason, in the electrophoretic dispersion liquid, each of the electrophoretic particles 1 exhibits uniform dispersion ability. The above-described number average molecular weight (Mn) and the weight-average molecular weight (Mw) can be measured as molecular weight in terms of polystyrene by using, for example, a gel permeation chromatography (GPC) method.

Further, in the dispersion portion 32, the molecular weight of the dispersion unit of the proximal end portion side which is bonded to the bonding portion 31 is preferably smaller than the molecular weight of the dispersion unit of the distal end portion side. More specifically, the molecular weight of the side chain which is included in the monomer M1 corresponding to a precursor of the dispersion unit positioned on the proximal end portion side is preferably smaller than the molecular weight of the side chain which is included in the monomer M1 corresponding to the precursor of the dispersion unit positioned on the distal end portion side. With this, it is possible to make further excellent dispersibility of the electrophoretic particle 1 in the electrophoretic dispersion liquid, and to bond the dispersion portion 32 onto the surface of the base particle 2 with high density.

In addition, a change of molecular weight of the side chain may become continuously larger to the proximal end side from the distal end side, or may become gradually larger to the proximal end side from the distal end side.

The bonding portion 31 is bonded onto the surface of the base particle 2 in the coated layer 3 provided in the electrophoretic particle 1. With this, the polymer 39 is bonded to the base particle 2.

In the embodiment, the bonding portion 31 is formed by polymerizing the plurality of second monomers M2 formed on the surface of the base particle 2, each of which is reacted with a hydroxyl group so as to be covalently bonded, and has the second functional group, and includes the plurality of bonding units (constituting units) derived from the monomers M2 which are arranged therein.

As such, it is possible to make further excellent dispersibility of the electrophoretic particles 1 by using the polymer 39 including the bonding portion 31 which has the plurality of bonding units of which has a functional group. That is, the polymer 39 has a plurality of the functional groups, and the plurality of functional groups are concentrically present in the bonding portion 31. Further, the bonding portion 31 is bonded to the plurality of bonding units, and thus has a large portion which can be reacted with the base particle 2 as compared with a case where only one bonding unit is present. For this reason, it is possible to reliably bond the polymer 39 onto the surface of the base particle 2 in the bonding portion 31 which is formed by polymerizing the plurality of monomers M2.

In addition, in the embodiment, the hydroxyl group is included on the surface of the base particle 2, and the functional group included in the monomer M2 is the alkoxysilyl group, as described above. When the hydroxyl group and the alkoxysilyl group are combined with each other, the reaction therebetween exhibits the excellent reactivity, and thus it is possible to reliably bond the polymer 39 onto the surface of the base particle 2 in the bonding portion 31. That is, the polymer 39 can reliably have a function as a coupling agent which is bonded onto the surface of the base particle 2.

Such a monomer M2 includes one alkoxysilyl group expressed by the following Formula (II) as a functional group, and one polymerizable group such that the polymerization is performed by the living radical polymerization.

(II)

[In the formula, each of R's independently represents an alkyl group having 1 to 4 carbon atoms, and n represents an integer of 1 to 3.]

When the above-described configuration is used as the monomer M2, it is possible to form the bonding portion 31 in which the monomers M2 are polymerized by the living radical polymerization, and the bonding portion 31 which is formed by the living radical polymerization exhibits the excellent reactivity with respect to the hydroxyl group positioned on the surface of the base particle 2.

In addition, examples of one polymerizable group included in the monomers M2 include polymerizable groups having a carbon-carbon double bond such as a vinyl group, a styryl group, and a (meth)acryloyl group.

Examples of such monomers M2 include a vinyl monomer, a vinyl ester monomer, a vinyl amide monomer, a (meth)acrylic monomer, a (meth)acrylic ester monomer, a (meth)acrylamide monomer, and a styryl monomer, each of which includes one alkoxysilyl group expressed by Formula (II), and more specifically include a silane-based monomer containing a silicon atom such as 3-(meth)acryloxypropyl triethoxy (methoxy)silane, vinyl triethoxy (methoxy)silane, 4-vinyl butyl triethoxy (methoxy)silane, 8-vinyl octyltriethoxy (methoxy)silane, 10-methacryloyloxydecyl triethoxy (methoxy)silane, and 10-acryloyloxydecyl triethoxy (methoxy)silane. In addition, these can be used alone or in combination of two or more types thereof.

In addition, in one polymer, the number of bonding units included in the bonding portion 31 may be equal to or greater than 1, and is preferably in a range of 2 to 10, and is further preferably in a range of 3 to 6. When the number of bonding units is larger than the upper limit, the bonding portion 31 has low affinity with respect to the dispersion medium as compared with the dispersion portion 32, and thus in accordance with the type of the monomer M2, the dispersibility of the electrophoretic particles 1 may be deteriorated or the bonding portions 31 may be partially reacted with each other. In addition, when the number of bonding units is smaller than the lower limit, in accordance with the type of the monomer M2, the monomer M2 cannot be sufficiently bonded to the base particle 2, and thus the dispersibility of the electrophoretic particles 1 may be deteriorated.

Further, the number of bonding units included in the bonding portion 31 can be obtained by the analysis by using a general-purpose analysis apparatus such as an NMR spectrum, an IR spectrum, an elemental analysis, and a gel permeation chromatography (GPC). Meanwhile, in the polymer 39, the bonding portion 31 and the dispersion portion 32 are high-molecular weight polymers, and thus have a certain molecular weight distribution. Accordingly, the above-described analysis result does not necessarily correspond to all of the polymers 39, but if the number of bonding units which is obtained by using at least one of the above-described methods is in a range of 2 to 8, it is possible to achieve the reactivity between the polymer 39 and the base particle 2, and the dispersibility and electrophoretic properties (charging properties) of the electrophoretic particle 1.

The polymer 39 can be obtained by using a manufacturing method described below. For example, when a reversible addition-fragmentation chain transfer polymerization (RAFT) method described below is used, it is possible to obtain a relatively uniform polymer. Accordingly, if 2 mole equivalents to 10 mole equivalents of the monomer M2 is added to, and polymerized with a chain transfer agent, it is possible to set the number of bonding units in the bonding portion 31 to be in the above-described range. In consideration of the aforementioned description, in a case where the additive rate of the monomer M2 is equal to or less than 100%, the polymerization reaction may be performed by setting the additive amount of the monomer M2 to be 2 mole equivalents to 10 mole equivalents.

Meanwhile, in a case where the bonding portion is generated after the dispersion portion 32 is generated, the dispersion portion 32 serves as the chain transfer agent. In this case, for example, the weight-average molecular weight and the number average molecular weight of the polymer which constitute the dispersion portion 32 are obtained by using the GPC method, and then the additive amount of the monomer M2 may be determined based on the obtained result values.

With this, it is possible to reliably exhibit an effect with the configuration such that the electrophoretic particle 1 includes the polymer 39, and thus the electrophoretic particle 1 has the excellent dispersibility in the electrophoretic dispersion liquid.

Such a polymer 39 which is provided with the dispersion portion 32 and the bonding portion 31 forms the coated layer 3 by bonding to at least a portion of the surface of the base particle 2; however, in the invention, in a case where the weight of the base particle 2 is set to be 100% by weight, the weight of the polymer (the particle surface treatment agent) 39 becomes in a range of 4% by weight to 8% by weight. When the weight of the polymer 39 which is bonded to the base particle 2 is lower than the lower limit, the obtainable effect by bonding the polymer 39 to the base particle 2 cannot be sufficiently obtained, and the electrophoretic particle 1 cannot be sufficiently dispersed in the electrophoretic dispersion liquid. In addition, in a case where the weight of the polymer 39 which is bonded to the base particle 2 is greater than the upper limit, the weight of the entire amount of the electrophoretic particles 1 becomes larger, and from this aspect, the electrophoretic particle 1 cannot be sufficiently dispersed in the electrophoretic dispersion liquid.

Therefore, the positive and negative electrophoretic particles are aggregated with each other and are adhered to the electrode surface, and as a result, there is a problem in that degradation of the contrast, change of the contrast with time, and the like are caused.

Note that, by the weight within the above range, the polymer 39 can be bonded to the base particle 2 in a case where the electrophoretic particle 1 is manufactured by applying the method of manufacturing an electrophoretic particle of the embodiment of the invention, and the description thereof will be described below in detail.

In addition, the weight of the polymer (the particle surface treatment agent) 39 may be in a range of 4% by weight to 8% by weight, is preferably in a range of 4.5% by weight to 7% by weight, and is further preferably in a range of 4.8% by weight to 6% by weight, with respect to 100% by weight of the base particle 2. With this, the electrophoretic particle 1 can be uniformly dispersed in the electrophoretic dispersion liquid, and thus it is possible to reliably suppress or prevent the positive and negative electrophoretic particles from being aggregated with each other and from being adhered to the electrode surface, thereby realizing the contrast improvement.

The electrophoretic particles 1 having the above described configuration are dispersed (suspended) in the dispersion medium (a liquid phase dispersion medium) in the electrophoretic dispersion liquid.

Dispersion Medium

In the embodiment, a material having a silicone oil as a main component is used as the aforementioned dispersion medium. The silicone oil exhibits the excellent affinity with respect to the dispersion portion 32 which is formed by the living radical polymerization performed by using the above-described silicone macromonomer as the monomer M1, and thus is used as a dispersion medium.

Figure 8:
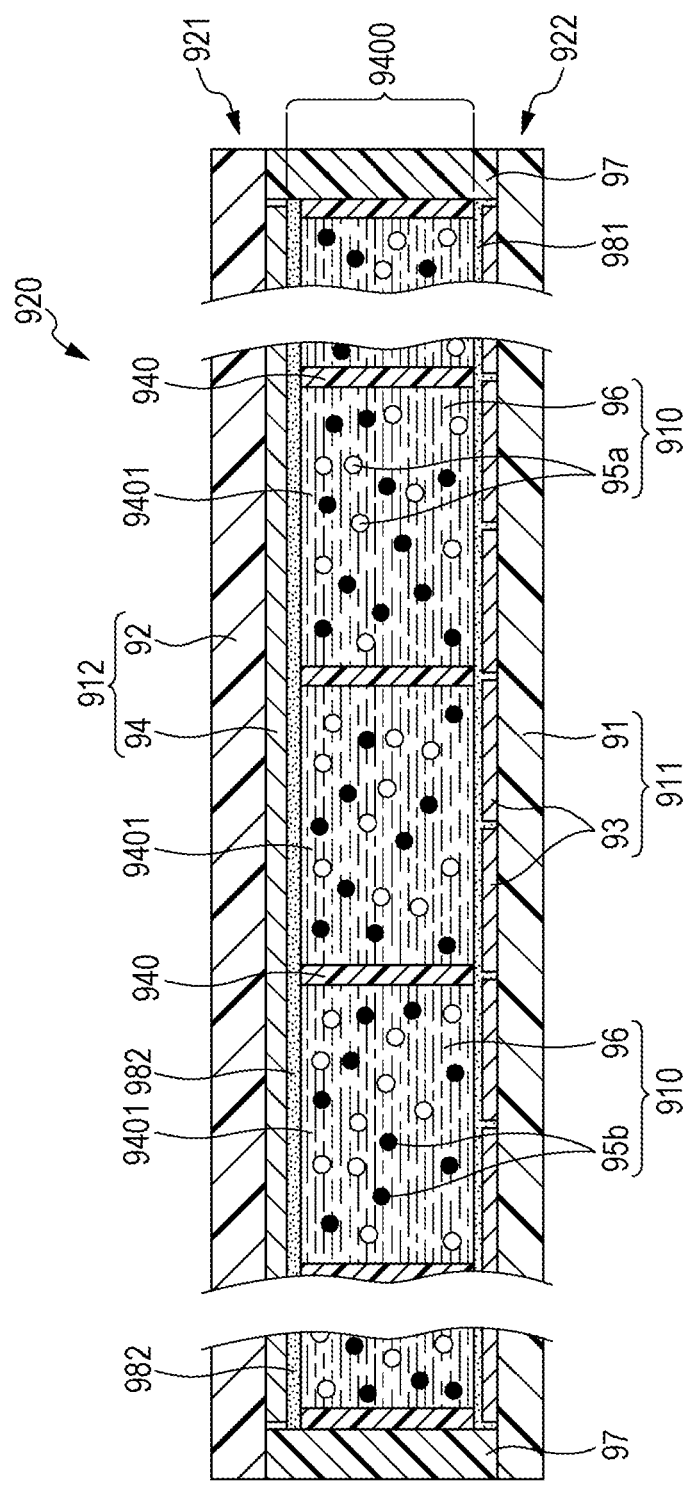
FIG. 8 is a diagram for schematically illustrating a longitudinal cross section of the electrophoretic display device of the embodiment.

With this, the effect of preventing the electrophoretic particles 1 from being aggregated is enhanced, and thus it is possible to prevent display properties of an electrophoretic display device 920 illustrated in FIG. 8 from being deteriorated over time. In addition, the silicone oil does not have an unsaturated bond and thus is excellent in weather resistance, and has high stability, which is an advantage.

Further, the kinetic viscosity of the silicone oil (the dispersion medium) at a normal temperature (25° C.) is preferably equal to or lower than 5 cs, and is further preferably in a range of 2 cs to 4 cs. Even though the viscosity of the silicone oil (the dispersion medium) is in the above-described range, if the electrophoretic particle 1 includes the dispersion portion 32 formed by the living radical polymerization performed by using the silicone macromonomer as the monomer M1, the electrophoretic particles 1 can be dispersed in the dispersion medium with the excellent dispersibility.

The weight-average molecular weight of the silicone oil is not particularly limited; however, it is preferably in a range of 250 to 700, and is further preferably in a range of 300 to 600. With this, it is possible to disperse the electrophoretic particle 1 in the electrophoretic dispersion liquid with more excellent dispersibility.

In addition, the relative permittivity of the silicone oil is preferably in a range of 1.5 to 3, and is further preferably in a range of 1.7 to 2.8. Such silicone oil is excellent in the dispersibility of the electrophoretic particles 1, and has satisfactory electric insulation. For this reason, the silicone oil contributes to the realization of the electrophoretic display device 920 which has small power consumption and is capable of displaying high contrast. Meanwhile, the value of dielectric constant is a value measured at 50 Hz, and is a value obtained by measuring the dispersion medium in which the amount of moisture is equal to or less than 50 ppm at a temperature of 25° C.

In addition, various additives such as a charge control agent, a lubricant, a stabilizer, and various dyes which are composed of particles such as an electrolyte, a surfactant (anionic or cationic), metal soap, a resin material, a rubber material, oil, varnish, and a compound are added in the dispersion medium, as necessary.

The electrophoretic dispersion liquid in which the above-described electrophoretic particle 1 is dispersed in the dispersion medium, that is, the electrophoretic dispersion liquid in which the electrophoretic particle 1, in which the weight of the polymer 39 bonded to the surface of the base particle 2 is in a range of 4% by weight to 8% by weight in a case where the weight of the base particle 2 is set to be 100% by weight, is dispersed in the dispersion medium can be manufactured as follows, for example. Method of manufacturing electrophoretic dispersion liquid.

Figure 3:
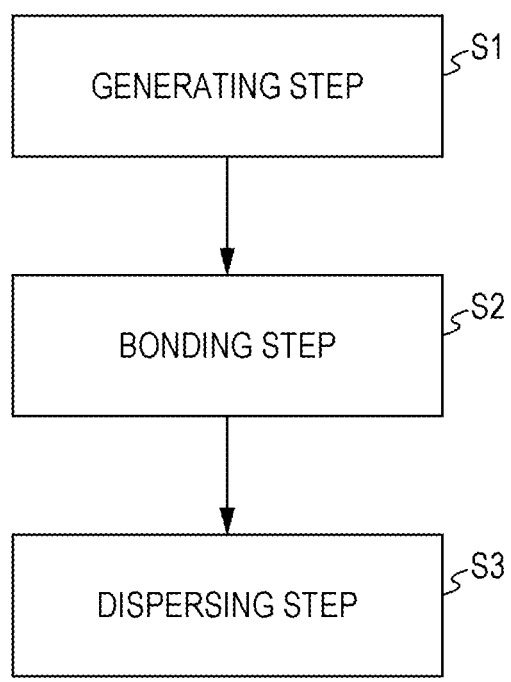
FIG. 3 is a flowchart illustrating method of manufacturing an electrophoretic dispersion liquid.

FIG. 3 is a flowchart illustrating a method of manufacturing an electrophoretic dispersion liquid.

The method of manufacturing the above-described electrophoretic dispersion liquid includes a generating step (S1) of generating the plurality of block copolymers 39 (the particle surface treatment agents) in which the dispersion portion 32 and the bonding portion 31 are bonded to each other, a bonding step (S2) of bonding the plurality of block copolymers 39 to the base particle 2 and thus forming the coated layer 3 by the reaction between the first functional group included in the base particle 2 and the second functional group included in the second monomer M2 so as to obtain the electrophoretic particle 1, and a dispersing step (S3) of dispersing the obtained electrophoretic particles 1 in the dispersion medium so as to obtain the electrophoretic dispersion liquid.

Note that, in the generation step, through the living radical polymerization performed by using a polymerization initiator, the bonding portion 31 in which the second monomers M2 having the second functional group are polymerized may be formed after forming the dispersion portion 32 in which the first monomers M1 are polymerized, or the dispersion portion 32 may be formed after forming the bonding portion 31. Here, the case where the bonding portion is formed after forming the dispersion portion 32 will be described.

Hereinafter, each step will be described in detail.

1. First, the plurality of block copolymers 39 in which the dispersion portion 32 and the bonding portion 31 are bonded to each other are generated (the generation step: S1).

1-1. First, the dispersion portion 32 in which the first monomers M1 are polymerized is formed by the living polymerization by performed by using the polymerization initiator.

Examples of the living polymerization method include a living radical polymerization method, a living cationic polymerization method, and a living anionic polymerization method. Among them, the living radical polymerization method is preferably used. When the living radical polymerization method is used, it is possible to simply use a reaction solution and the like generated in the reaction system, and to polymerize the monomers M1 with satisfactory controllability of the reaction.

In addition, examples of the living radical polymerization method include an atom transfer radical polymerization (ATRP) method, a radical polymerization (NMP) method via nitroxide, a radical polymerization (TERP) method performed by using organotellurium, and a reversible addition-fragmentation chain transfer polymerization (RAFT) method. Among them, the reversible addition-fragmentation chain transfer polymerization (RAFT) method is preferably used. According to the reversible addition-fragmentation chain transfer polymerization (RAFT) method, it is possible to simply polymerize the monomers M1. Further, it is possible to easily set the molecular weight distribution to be equal to or less than 1.2 in the dispersion portion 32.

The polymerization initiator (a radical polymerization initiator) is not particularly limited; however, examples thereof include an azo initiator such as 2,2'-azobisisobutyronitrile (AIBN), 2,2'-azobis(4-methoxy-2,4-dimethylvaleronitrile), 2,2'-azobis(2,4-dimethylvaleronitrile), dimethyl 2,2'-azobis(2-methylpropionate), 1,1'-azobis(cyclohexane-1-carbonitrile), 2,2'-azobis[2-(2-imidazolin-2-yl) propane] dihydrochloride, and 2,2'-azobis[2-(2-imidazolin-2-yl) propane], and persulfate such as potassium persulfate, and ammonium persulfate.

In addition, in the case where the reversible addition-fragmentation chain transfer polymerization (RAFT) method is used, a chain transfer agent (a RAFT agent) is used other than the polymerization initiator. The chain transfer agent is not particularly limited; however, examples thereof include a sulfur compound having a functional group such as a dithioester group, a trithiocarbamate group, a xanthate group, and a dithiocarbamate group.

Specifically, examples of the chain transfer agent include a compound expressed by the following Formulae (1) to (7), and these may be used alone or in combination of two or more types thereof. These compounds are relatively easily available, and can easily perform control of the reaction, and thus are preferably used.

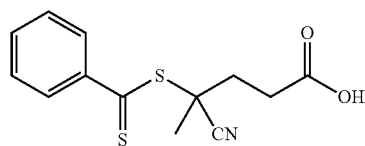

(1)

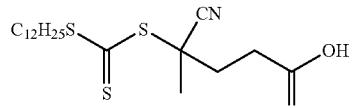

(2)

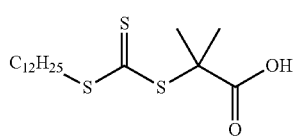

(3)

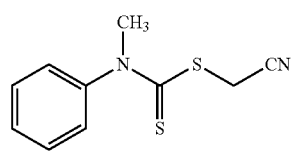

(4)

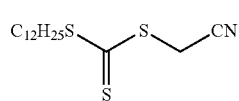

(5)

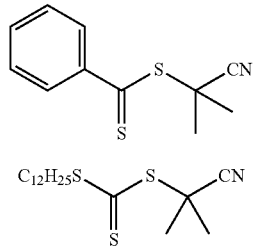

(6)

(7)

Among these, the chain transfer agent is preferably 2-cyano-2-propyl benzo dithioate expressed by the above-described Formula (6). With this, it is possible to more easily control the reaction.

Further, in a case where the reversible addition-fragmentation chain transfer polymerization (RAFT) method is used, the ratio of the monomer M1, the polymerization initiator, and the chain transfer agent is appropriately determined in consideration of a polymerization degree of the dispersion portion 32 to be formed and the reactivity between compounds such as the monomer M1, and the molar ratio between the monomer M1, the polymerization initiator, and the chain transfer agent is preferably monomer:polymerization initiator:chain transfer agent=500 to 5:5 to 0.25:1. With this, it is possible to set the length (polymerization degree) of the dispersion portion 32 which is obtained by polymerizing the monomers M1 to be an appropriate size.

In addition, examples of the solvent for preparing the solution which polymerizes the monomers M1 by the living radical polymerization include water, alcohol such as methanol, ethanol, and butanol, a hydrocarbon such as hexane, octane, benzene, toluene, and xylene, an ether such as diethyl ether and tetrahydrofuran, an ester such as ethyl acetate and butyl acetate, a halogenated aromatic hydrocarbon such as chlorobenzene and o-dichlorobenzene. These may be used alone or as a mixed solvent.

In addition, it is preferable that the solution (a reaction solution) is subjected to a deoxygenation treatment before starting the polymerization reaction. Examples of the deoxygenation treatment include substitution after the vacuum degassing due to an inert gas such as an argon gas and a nitrogen gas, and a purge treatment.

Further, at the time of the polymerization reaction of the monomer M1, it is possible to further rapidly and reliably perform the polymerization reaction of the monomers by heating the solution up to a certain temperature.

The heating temperature is slightly different depending on the type of the monomer M1, and thus is not particularly limited; the heating temperature is preferably in a range of approximately 30° C. to 100° C. In addition, the heating time (reaction time) is preferably in a range of 3 hours to 48 hours in a case where the heating temperature is set to be in the above-described range.

Meanwhile, in a case where the reversible addition-fragmentation chain transfer polymerization (RAFT) method is used, a fragment of the chain transfer agent which is used as one terminal (a tip end portion) of the dispersion portion 32 remains. Then, the dispersion portion 32 having the aforementioned fragment acts as the chain transfer agent in the reaction of polymerizing the dispersion portion 32 and the bonding portion 31 in the following step 1-2.

1-2. Next, the bonding portion 31 in which the second monomers M2 each of which has the second functional group having the reactivity with the first functional group included in the base particle 2 are polymerized is formed so as to be bonded to the dispersion portion 32.

With this, the polymer 39 configured with a block copolymer in which the dispersion portion 32 and the bonding portion 31 are bonded to each other is generated.

In addition, in the step 1-2, before forming the bonding portion 31 which uses the monomer M2, impurities such as the solvent and the polymerization initiator which are used in the previous step 1-1 are removed as necessary such that the dispersion portion 32 may be subjected to a purification treatment (a removing treatment) for isolating and purifying. With this, the obtained polymers 39 become more uniform and are highly purified. The aforementioned purification treatment is not particularly limited, and for example, examples thereof include a column chromatography method, a recrystallization method, and a re-precipitation method. These may be used alone or in combination of two or more types thereof.

In addition, as described above, in a case where the reversible addition-fragmentation chain transfer polymerization (RAFT) method is used, the fragment of the chain transfer agent which is used as one terminal of the dispersion portion 32 remains. For this reason, the bonding portion 31 having the above-described configuration is formed in such a manner that a solution containing the dispersion portion 32, the monomer M2, and the polymerization initiator which are obtained after the previous step 1-1 is prepared and the living polymerization is performed again in the aforementioned solution.

Note that, as the solvent used in the current step, the same solvent as that used in the previous step 1-1 can be used, and it is possible to set the condition at the time of polymerizing the monomers M2 in the solution to be the same as the condition at the time of polymerizing the monomers M1 in the solution in the previous step 1-1.

In addition, after the current step 1-2, impurities such as a solvent used in the current step 1-2 are removed, and the polymer 39 is subjected to a purification treatment (a removing treatment) for isolating and purifying. With this, the polymer 39 can be smoothly bonded to the base particle 2 in the next step 2; however, the description thereof will be described below in detail. The aforementioned purification treatment is not particularly limited, and for example, examples thereof include a column chromatography method, a recrystallization method, and a re-precipitation method. These may be used alone or in combination of two or more types thereof.

2. Next, the coated layer 3 is formed in such a manner that the first functional group included in the base particle 2 and the plurality of second functional groups in the bonding portion 31 are reacted with each other and then are chemically bonded to each other such that the plurality of block copolymers 39 (the particle surface treatment agent) are bonded to the surface of the base particle 2 (the bonding step; S2).

With this, it is possible to obtain the electrophoretic particle 1 in which at least a portion of the base particle 2 is coated with the coated layer 3.

The electrophoretic particle 1 is manufactured by applying the method of manufacturing an electrophoretic particle of the embodiment of the invention to the current step as described below.

In this regard, as described above, typically, the polymer 39 is bonded onto the surface of the base particle 2 in such a manner that a solution is prepared by mixing the polymer 39 and the base particle 2 in the solvent, then the solution is heated while being stirred, and thus a chemical bond is formed between the alkoxysilyl group (the second functional group) and the hydroxyl group (the first functional group).

In this case, it is considered that the solvent which is used at the time of preparing the solution is the same as that in the previous step 1-1, and the silicone oil described as the dispersion liquid contained in the electrophoretic dispersion liquid is used.

However, in a case where the solvent is contained in the solution as described above, if the solvent exhibits hydrophilicity as compared with the dispersion portion 32, the dispersion portions 32 exhibiting hydrophobicity are aggregated with each other, and as a result, there is a problem in that the polymers 39 are aggregated with each other in the solution, the adsorption amount of the polymer 39 with respect to the base particle 2 is not improved. Further, even in a case where the solvent exhibits hydrophobicity similar to the dispersion portion 32 such as the case where the silicone oil is used as the solvent, the solvent is adsorbed on the surface of the base particle 2. Due to this, there is a problem in that the adsorption amount of the polymer 39 with respect to the base particle 2 is not improved likewise.

In contrast, the solvent for dissolving the polymer 39 is not added into the mixture containing the base particle 2 and the polymer 39 in the invention. With this, it is possible to increase the number of the case where the polymer 39 comes in contact with the base particle 2.

However, the inventors of the invention have studied and found that even though the solvent is not added into the mixture containing the base particle 2 and the polymer 39 as described above, it is not possible to sufficiently increase adsorption amount of the polymer 39 with respect to the base particle 2 in some cases.

Here, as described in the previous step 1-2, after the previous step 1-2, the polymer 39 is subjected to the purification treatment (a removing treatment) for isolating and purifying so as to remove impurities such as the solvent used in the previous step 1-2.

Further, in the dispersion portion 32 which is formed by the living radical polymerization performed by using the silicone macromonomer (the siloxane-based compound) expressed by the above-described Formula (I) as the monomer M1, the silicone macromonomer expressed by the above-described Formula (I) is typically generated by being polymerized through the hydrosilylation reaction as the following Reaction formula (i). For this reason, the unreacted product expressed by the following Formula (i-2) remains in the reaction system.

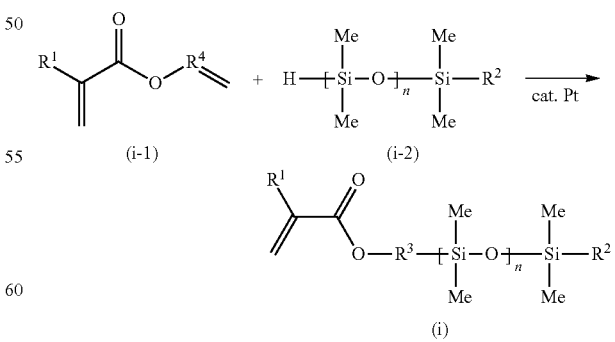

[In the formula, $R^1$ represents a hydrogen atom or a methyl group, $R^2$ represents a hydrogen atom or an alkyl group having 1 to 4 carbon atoms, $R^3$ represents a structure including one of an alkyl group having 1 to 6 carbon atoms and an ether group of ethylene oxide or propylene oxide, $R^4$ represents a structure in which a methylene group is removed from the terminal on the Si side of $R^3$, and n represents an integer of 0 or greater.]

As described above, even though the purification treatment is performed by using a column chromatography method, a recrystallization method, and a re-precipitation method in order to isolate and purify the polymer 39, the silicone macromonomer expressed by the above-described Formula (I), and the unreacted product expressed by the above-described Formula (i-2) exhibit substantially the same physical properties, and thus such an unreacted product and the reaction by-product generated at the time of generating the polymer 39 are mixed into the purified the polymer 39.

Specifically, for example, the weight-average molecular weight of the unreacted product expressed by the above-described Formula (i-2) is preferably in a range of 1,000 to 50,000, and is further preferably in a range of 3,000 to 30,000.

In addition, in a case where the unreacted product expressed by the above-described Formula (i-2) is defined by a boiling point, the boiling point is set to be preferably in a range of 180° C. to 250° C., and further preferably in a range of 200° C. to 240° C.

The fact that the mixing of the unreacted product and the reaction by-product is a factor that cannot sufficiently increase the adsorption amount of the polymer 39 with respect to the base particle 2 even in a case where the solvent is not added into the mixture containing the base particle 2 and the polymer 39, is apparent by the further study of the inventors, and it was found that the above-described problem can be solved by setting the content of the polymer (the particle surface treatment agent) 39 except for the plurality of base particles 2 in the mixture containing the base particle 2 and the polymer 39 to be equal to or greater than 70% by weight, and thus the invention has been completed.

That is, in a case where the content of the polymer (the particle surface treatment agent) 39 except for the plurality of base particles 2 in the mixture containing the base particle 2 and the polymer 39 is set to be equal to or greater than 70% by weight, it is possible to sufficiently increase the adsorption amount of the polymer 39 with respect to the base particle 2, and as a result, it is possible to obtain the electrophoretic particle 1 which includes the coated layer 3 in which the weight of the polymer (the particle surface treatment agent) 39 is in a range of 4% by weight to 8% by weight in a case where the weight of the base particle 2 is set to be 100% by weight. For this reason, the electrophoretic particle 1 is sufficiently dispersed in the electrophoretic dispersion liquid, and thus it is possible to reliably suppress or prevent the positive and negative electrophoretic particles from being aggregated with each other and from being adhered to the electrode surface. Therefore, the problem in that degradation of the contrast, change of the contrast with time, and the like are caused can be solved.

The current step 2 in which the content of the polymer (the particle surface treatment agent) 39 is set to be equal to or greater than 70% by weight as described above, and the polymer 39 is boned to the surface of the base particle 2 is more specifically embodied as follows.

2-1. First, the Mixture Containing the Base Particle 2 and the Polymer 39 is Prepared.

At this time, as described above, the unreacted product (for example, the unreacted product expressed by the above-described Formula (i-2)) of the raw material used at the time of generating the polymer 39 and the reaction by-product generated at the time of generating the polymer 39 are mixed into the mixture; however, in the invention, the mixture in which the content of the polymer 39 except for the base particle 2 in the mixture is set to be equal to or greater than 70% by weight is prepared.

Note that, the content of the polymer 39 except for the base particle 2 in the mixture may be equal to or greater than 70% by weight, is preferably equal to or greater than 80% by weight, and is further preferably in a range of 90% by weight to 95%. With this, it is possible to reliably improve the adsorption amount of the polymer 39 with respect to the base particle 2.

Further, in the mixture, in a case where the weight of the base particle 2 is set to be 100% by weight, the weight of the polymer 39 is preferably in a range of 50% by weight to 500%, and is further preferably in a range of 100% by weight to 200%. When the content of the polymer 39 is set to be within the above-described range, it is possible to increase the number of the case where the polymer 39 comes in contact with the surface of the base particle 2, and thus the polymer 39 can be reliably and uniformly adsorbed on the surface of the base particle 2.

2-2. Subsequently, the Polymer 39 is Bonded onto the Surface of the Base Particle 2 in the Mixture.

With this, it is possible to obtain the electrophoretic particles 1 in which the coated layer 3 is formed on at least a portion of the surface of the base particle 2.

The bonding of the polymer 39 onto the surface of the base particle 2 is performed by heating the mixture.

The temperature at the time of heating the mixture is not particularly limited, but is preferably in a range of 100° C. to 250° C., and is further preferably in a range of 150° C. to 200° C.

In addition, the time for heating the mixture is preferably in a range of 1 hour to 15 hours, and is further preferably in a range of 3 hours to 10 hours.

When the mixture is heated under the above-described conditions, it is possible to reliably bond the polymer 39 onto the surface of the base particle 2, and as a result, it is possible to reliably obtain the electrophoretic particle 1 which includes the coated layer 3 in which the weight of the polymer (the particle surface treatment agent) 39 is in a range of 4% by weight to 8% by weight in a case where the weight of the base particle 2 is set to be 100% by weight.

Note that, before heating the mixture, the mixture may be subjected to the ultrasonic treatment. With this, it is possible to improve the dispersibility of the base particle 2 in the mixture.

In addition, it is preferable that the mixture be heated while being stirred. With this, the polymer 39 can uniformly come in contact with the surface of the base particle 2.

The mixture is stirred by using, for example, a ball mill and a bead mill.

2-3. Next, the remaining polymers 39 which are adsorbed onto the surface of the base particle 2, and the unreacted product and the reaction by-product are removed by using a centrifugal separator without forming the aforementioned chemical bond.

In this way, it is possible to obtain the purified electrophoretic particle 1.

3. Next, the electrophoretic dispersion liquid is obtained by dispersing the obtained electrophoretic particle 1 in the dispersion medium.

In the embodiment, a material having the aforementioned silicone oil as a main component is used as the aforementioned dispersion medium.

In addition, the method of dispersing the electrophoretic particle 1 in the dispersion medium is not particularly limited; however, examples thereof include a paint shaker method, a ball mill method, a media mill method, an ultrasonic dispersion method, and a stirring dispersion method. These may be used alone or in combination of two or more types thereof.

With such steps described above, it is possible to obtain the electrophoretic dispersion liquid in which the positive and negative electrophoretic particles are reliably suppress or prevent from being aggregated with each other and from being adhered to the electrode surface, and as a result, the problem in that degradation of the contrast, change of the contrast with time, and the like are caused is solved.

Second Embodiment

Next, the second embodiment of the electrophoretic particle included in the electrophoretic dispersion liquid will be described.

Figure 4:
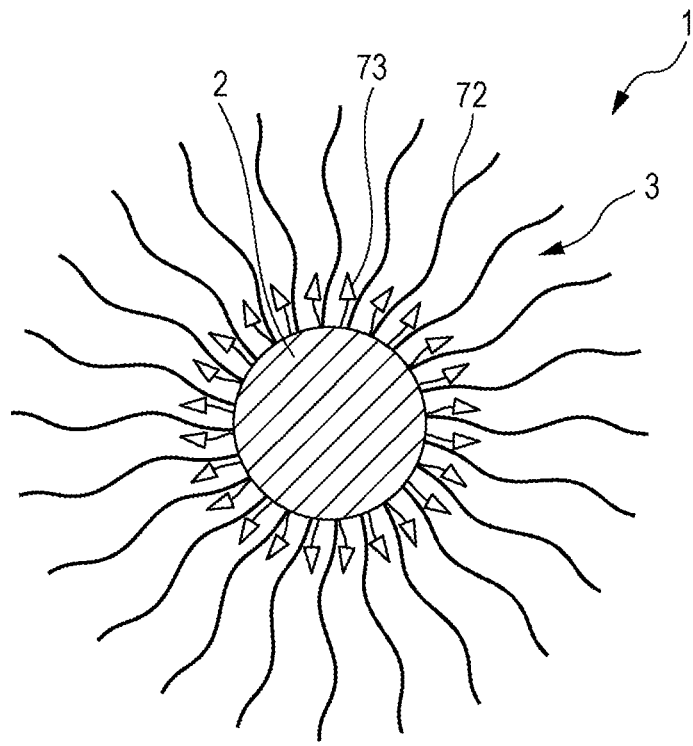
FIG. 4 is a longitudinal sectional view illustrating an electrophoretic particle contained in an electrophoretic dispersion liquid according to a second embodiment of the invention.
Figure 5:
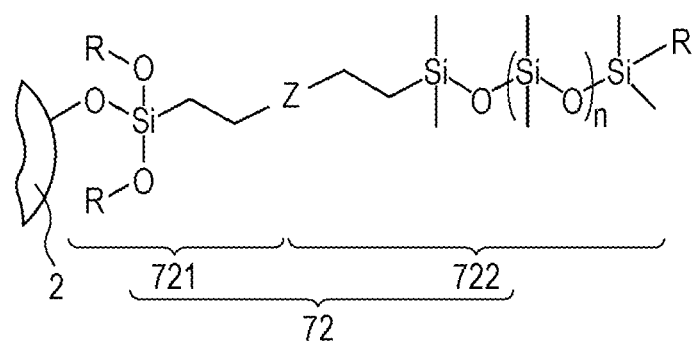
FIG. 5 is a diagram illustrating a siloxane-based coupling agent which is bonded onto a surface of a base particle of the electrophoretic particle illustrated in FIG. 4.

FIG. 4 is a longitudinal sectional view illustrating the second embodiment the electrophoretic particle contained in the electrophoretic dispersion liquid of the embodiment of the invention, FIG. 5 is a diagram illustrating a siloxane-based coupling agent which is bonded onto a surface of a base particle of the electrophoretic particle illustrated in FIG. 4, FIG. 6 is a diagram illustrating, regarding a coupling agent and a modified silicone oil which are used to obtain the siloxane-based coupling agent having a structure Z illustrated in FIG. 5, specific examples of a reactive functional group X contained in the coupling agent, and a reactive functional group Y contained in the modified silicone oil, and FIG. 7A to FIG. 7F are diagrams illustrating a polarization group which is bonded onto the surface of the electrophoretic particle illustrated in FIG. 4.

Hereinafter, the electrophoretic particle of the second embodiment will be described, but the description will focus on the differences from the electrophoretic particle of the first embodiment and the same matters will be omitted.

Regarding the electrophoretic particle of the embodiment, the coated layer 3 which is included in the electrophoretic particle 1 is the same as the coated layer 3 which is included in the electrophoretic particle 1 in the first embodiment as illustrated in FIG. 2 except for the configuration thereof as illustrated in FIG. 4.

That is, in the electrophoretic particle 1 of the second embodiment, instead of the block copolymer 39, a siloxane-based coupling agent 72 and a polarization group 73 are bonded to each other on the surface of the base particle 2 so as to form the coated layer 3.

Accordingly, in the embodiment, the siloxane-based coupling agent 72 and the polarization group 73 constitute the particle surface treatment agent which is used to form the electrophoretic particle 1.

Hereinafter, the siloxane-based coupling agent 72 and the polarization group 73 will be described.

The siloxane-based coupling agent 72 exhibits excellent affinity with respect to a silicone oil used as a dispersion medium which is included in the electrophoretic dispersion liquid, and thus is provided on the surface of the base particle 2 in the coated layer 3 so as to impart the dispersibility to the electrophoretic particle 1 in the electrophoretic dispersion liquid.

The siloxane-based coupling agent 72 is a compound (particle surface treatment agent) having a straight-chain molecular structure which is configured to include a coupling structure in which a plurality of siloxane bonds are coupled in series (hereinafter, referred to as a "silicone main chain") as a main chain, and a side chain which is bonded to the main chain while being bonded to the surface of the base particle 2.

Specific examples of such a siloxane-based coupling agent 72 include a compound bonded onto the surface of the base particle 2 via the side chain derived from the coupling agent, as illustrated in FIG. 5.

The siloxane-based coupling agent 72 is obtained by performing dehydration condensation reaction between a hydrolyzable group derived from the coupling agent and a hydroxyl group on the surface of the base particle 2 which are the reactants obtained by the reaction between the modified silicone oil and the coupling agent. Such a siloxane-based coupling agent 72 is configured to include a structure derived from the silicone oil and a structure derived from the coupling agent, and a structure 722 derived from the silicone oil is bonded to the base particle 2 via a structure 721 derived from the coupling agent.

The weight-average molecular weight of the siloxane-based coupling agent 72 is preferably in a range of approximately 1,000 to 100,000, and is further preferably in a range of approximately 10,000 to 60,000. When the above weight-average molecular weight is set to be in the above-described range, the length of the molecular structure of the siloxane-based coupling agent 72 is optimized, and thus the electrophoretic particle 1 to which the dispersibility derived from the linear structure with a long chain is sufficiently imparted while sufficiently securing an area in which the polarization group 73 can be introduced to the surface of the base particle 2.

Note that, the weight-average molecular weight of the siloxane-based coupling agent 72 is the weight-average molecular weight of the in terms of polystyrene, which is measured by using the gel permeation chromatography (GPC) method.

Further, n in FIG. 5 is preferably in a range of approximately 12 to 1,400, and is further preferably in a range of approximately 130 to 800 from the same reason as that of the above-described weight-average molecular weight.

In addition, the structure Z in FIG. 5 is a structure obtained by reacting the reactive functional group X included in the coupling agent and the reactive functional group Y included in the silicone oil with each other.

Examples of the reactive functional groups X and Y include those illustrated in FIG. 6. R in FIG. 6 represents an aliphatic hydrocarbon group such as an alkyl group.

Meanwhile, the terminal and the side chain of the siloxane-based coupling agent 72 are preferably configured to include a substituent with low polarity. With this, it is possible to further improve the dispersibility of the electrophoretic particles 1. Examples of the specific substituent include an alkyl group.

The polarization group 73 is provided on the surface of the base particle 2 so as to impart the charging properties to the electrophoretic particle 1 in the electrophoretic dispersion liquid.

The polarization group 73 is an organic group having a main skeleton, and a substituent bonded to the main skeleton.

In the polarization group 73, the electrons are maldistributed (polarized) in the main skeleton by setting at least one of conditions from the type of substituents (an electron attracting group and/or an electron donating group), and the number of bonding times and a bonding position with respect to the main skeleton, and thus the charging state of the electrophoretic particle 1 is controlled.

In other words, for example, in the polarization group 73 in which an electron attractive group (electron attracting group) is bonded as a substituent to the main skeleton on the end portion side (hereinafter, referred to as a "terminal of the main skeleton") which is the side opposite to the base particle 2, the electrons are maldistributed in the main skeleton on the terminal side further than the base particle 2 side. When such a polarization group 73 is introduced, the base particle 2 (the electrophoretic particle 1) is negatively charged.

On the other hand, in the polarization group 73 in which the electron attracting group is bonded as a substituent to the main skeleton on the base particle 2 side, the electrons are maldistributed to the main skeleton on the base particle 2 side further than the terminal side. When such a polarization group 73 is introduced, the base particle 2 (the electrophoretic particle 1) is positively charged.

Further, in the polarization group 73 in which an electron donative group (the electron donating group) is bonded to the main skeleton as a substituent, the maldistribution of the electron density which is opposite to that described above occurs, and thus in a case where the polarization group 73 in which the electron donating group is bonded to the main skeleton on the terminal side is introduced, the base particle 2 (the electrophoretic particle 1) is positively charged, and in a case where the polarization group 73 in which the electron donating group is bonded to the main skeleton on the base particle 2 side, the base particle 2 (the electrophoretic particle 1) is negatively charged.

In addition, as the number of substituents which are bonded to the main skeleton is increased, the maldistribution of the electron density tends to be increased.

It is possible to control (adjust) the base particle 2 to be in a desired charging state by properly selecting the polarization group 73 in which the above-described deviation of the electron density occurs and introducing the selected polarization group 73 to the surface of the base particle 2.

The main skeleton of the polarization group 73 is preferably in a state where the maldistribution of the electron density easily occurs. Accordingly, the main skeleton preferably has a portion (a structure) in which π electrons are delocalized. With this, the electron transfer more easily and smoothly occurs in the main skeleton, and thus the above-described effect is more remarkably exhibited.

The entire portion in which the π electrons are delocalized may be a structure in which conjugated double bonds are continuous in a straight line; however, at least a portion thereof has preferably a ring structure that forms a ring shape. With this, the electron transfer more easily and smoothly occurs in the main skeleton.

There are various types of ring structures; however, an aromatic ring is preferable, and a benzene ring, a naphthalene ring, a pyridine ring, a pyrrole ring, a thiophene ring, an anthracene ring, a pyrene ring, a perylene ring, a pentacene ring, a tetracene ring, a chrysene ring, an azulene ring, a fluorene ring, a triphenylene ring, a phenanthrene ring, a quinoline ring, an indole ring, a pyrazine ring, an acridine ring, a carbazole ring, a furan ring, a pyran ring, a pyrimidine ring, or a pyridazine ring is particularly preferable. With this, it is likely that the maldistribution (polarization) of the electron density occurs in the ring structure, and thereby it is possible to make the maldistribution of the electron density more remarkable in the main skeleton.

Further, it is preferable that the main skeleton has a ring structure at the terminal thereof, and the substituent is bonded to the ring structure. With this, it is likely that maldistribution (polarization) of the electron density in the ring structure, and thereby it is possible to make the maldistribution of the electron density more remarkable in the main skeleton.

In the electrophoretic particle 1, the substituent is preferably an electric attracting group or an electron donating group. With this, it is possible to more reliably charge the base particle in a positive or negative manner.

Here, an example of a case where the main skeleton has a benzene ring at the terminal thereof will be described below.

Figure 7A:
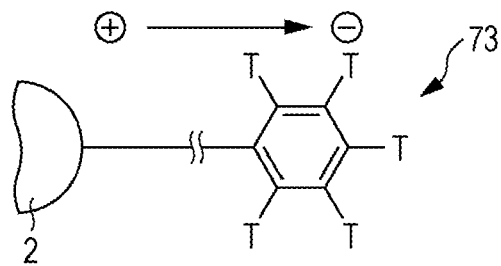
FIG. 7A to FIG. 7F are diagrams illustrating a polarization group which is bonded onto the surface of the electrophoretic particle illustrated in FIG. 4.

In this case, I: when an electron attracting group T is bonded as a substituent to each of at least three positions of 3-position to 5-position among 2-position to 6-position of the benzene ring (in FIG. 7A, all of the positions in 2-position to 6-position), as illustrated in FIG. 7A, due to the existence of the electron attracting group T, the electrons in the main skeleton is maldistributed by being attracted to the terminal side. For this reason, the base particle 2 is negatively charged.

Figure 7B:
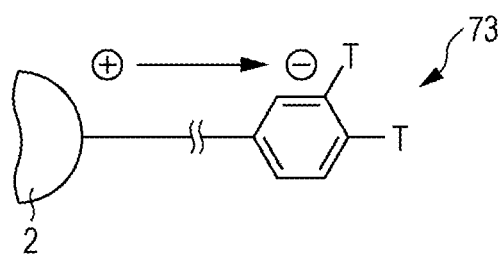

II: When the electron attracting group T is bonded as a substituent to at least one position of 3-position, 4-position, and 5-position of the benzene ring (in FIG. 7B, positions of 3-position and 4-position), as illustrated in FIG. 7B, due to the existence of the electron attracting group T, the electrons in the main skeleton (particularly, on the benzene ring) are maldistributed by being attracted to the terminal side. For this reason, the base particle 2 is negatively charged.

Figure 7C:
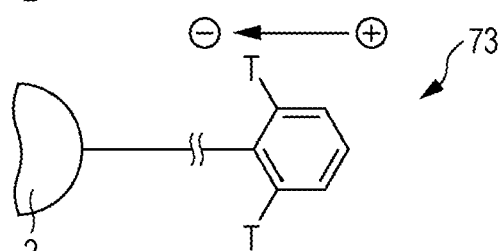

III: When the electron attracting group T is bonded as a substituent to at least one position of 2-position and 6-position of the benzene ring (in FIG. 7C, 2-position and 6-position), as illustrated in FIG. 7C, due to the existence of the electron attracting group T, the electrons in the main skeleton (particularly, on the benzene ring) are maldistributed by being attracted to the base particle 2 side. For this reason, the base particle 2 is positively charged.

Figure 7D:
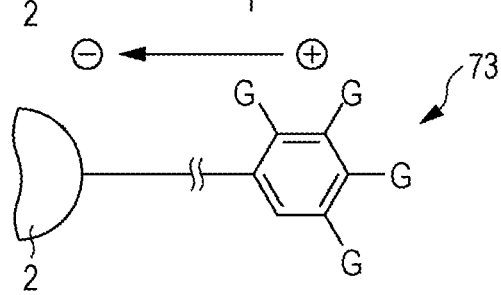

IV: When an electron donating group G is bonded as a substituent to each of at least three positions of 3-position to 5-position among 2-position to 6-position of the benzene ring (in FIG. 7D, four positions of 2-position to 5-position), as illustrated in FIG. 7D, due to the existence of the electron donating group G, the electrons in the main skeleton is maldistributed by being attracted to the base particle 2 side. For this reason, the base particle 2 is positively charged.

Figure 7E:
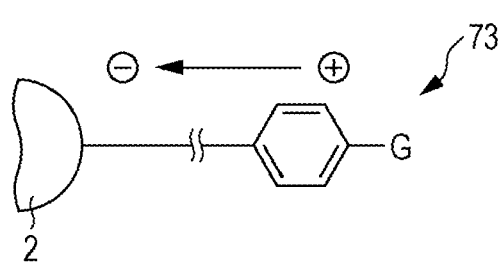

V: When the electron donating group G is bonded as a substituent to at least one position of 3-position, 4-position, and 5-position of the benzene ring (in FIG. 7E, 4-position), as illustrated in FIG. 7E, due to the existence of the electron donating group G, the electrons in the main skeleton (particularly, on the benzene ring) are maldistributed by being pushed to the base particle 2 side. For this reason, the base particle 2 is positively charged.

Figure 7F:
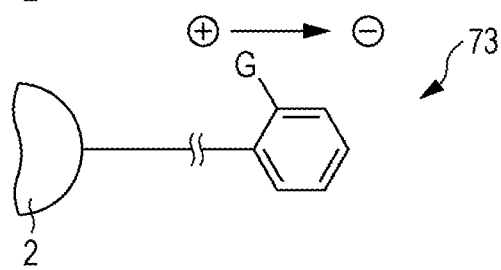

VI: When the electron donating group G is bonded as a substituent to at least one position of 2-position and 6-position of the benzene ring (in FIG. 7F, 2-position), as illustrated in FIG. 7F, due to the existence of the electron donating group G, the electrons in the main skeleton (particularly, on the benzene ring) are maldistributed by being pushed to the terminal side. For this reason, the base particle 2 is negatively charged.

Note that, the configuration II and the configuration VI, and the configuration III and the configuration V may be respectively combined with each other. With this, it is possible to make further remarkable maldistribution of the electron density in the main skeleton (particularly, on the benzene ring).

In addition, the main skeleton may be formed of only one ring structure described above, or may be formed of a structure in which a plurality of ring structures are bonded in a straight chain. Specific examples of the main skeleton having the latter structure include those expressed by the following Formulae (A-1) to (A-3).

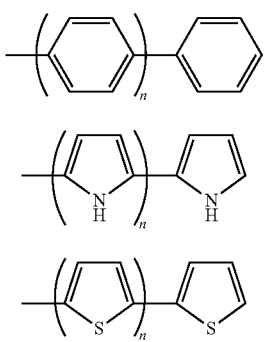

Here, In Formulae (A-1) to (A-3), n represents an integer of 1 or greater.

Note that, in the main skeletons expressed by the above-described Formulae (A-1) to (A-3), the substituent is preferably bonded to the ring structure at the terminal, but may be bonded to the ring structures at the position other than the terminal.

The electron attracting group T is not particularly limited as long as the substituent tends to strongly attract (adsorb) the electrons as compared with the hydrogen atom; however, examples thereof include a halogen atom such as F, Cl, Br, and I, a cyano group, a nitro group, a carboxyl group, a trifluoromethyl group, a formyl group, and a sulfo group. Among them, preferred examples of the electron attracting group include at least one selected from the group consisting of the halogen atom, the cyano group, the nitro group, the carboxyl group, and the trifluoromethyl group. These groups particularly have high function of attracting electrons.

On the other hand, the electron donating group G is not particularly limited as long as the substituent tends to strongly push (donate) the electrons as compared with the hydrogen atom; however, examples thereof include an amino group, an alkyl group, an alkoxy group, and a hydroxyl group. Among them, preferred examples of the electron donating group include at least one type selected from the group consisting of the amino group, the alkyl group, and the alkoxy group. These groups particularly have a high function of pushing electrons.

An alkyl group preferably has 1 to 30 carbon atoms, and further preferably has 1 to 18. An alkoxy group preferably has 1 to 30 carbon atoms, and further preferably has 1 to 18. In the alkyl group and the alkoxy group, if the number of the carbons is excessive, it is likely that the alkyl groups and the alkoxy groups respectively aggregated, and thereby it may be difficult to adjust the charging state of the base particle 2 to be in a desired state.

In addition, the total number of the carbon atoms in the main skeleton is preferably in a range of 6 to 40, and is further preferably in a range of 6 to 35. If the total number of carbon atoms is excessively small, it is less likely that the electrons are delocalized, and thus the maldistribution of the electrons may be not efficiently caused. On the other hand, if the total number of carbon atoms in the main skeletons is excessively large, it less likely that the polarization group 73 is introduced to the surface of the base particle 2.

As described above, the polarization group 73 is preferably introduced to the surface of the base particle 2 through the covalent bond. With this, it is possible to reliably prevent the polarization group 73 from being separated from the surface of the base particle 2. For this reason, it is possible to maintain the charging state of the base particle 2 for a long time of period.

It is preferable that the polarization group 73 has a structure derived from the coupling agent which is bonded onto the surface of the base particle 2, and the ring structure is bonded to the surface of the base particle 2 via the structure derived from the coupling agent.

Here, in the electrophoretic particle 1 of the embodiment, as described above, the siloxane-based coupling agent 72 and the polarization group 73 constitute the particle surface treatment agent which is used to form the electrophoretic particle 1.

That is, in the embodiment, the electrophoretic particle 1 which is provided with the coated layer 3 covering at least a portion of the base particle 2 is formed by bonding the siloxane-based coupling agent 72 and polarization group 73 which form the particle surface treatment agent to the base particle 2.

The bonding of the siloxane-based coupling agent 72 and the polarization group 73 to the base particle 2 can be embodied by using the siloxane-based coupling agent 72 and the polarization group 73 instead of the polymer 39 in the method of bonding the polymer 39 to the base particle 2 as described in the first embodiment.

Note that, the siloxane-based coupling agent (the siloxane-based compound) 72 is typically generated through the reaction expressed by the following Reaction formula (ii). For this reason, the unreacted product expressed by the following Formula (ii-2) remains in the reaction system.

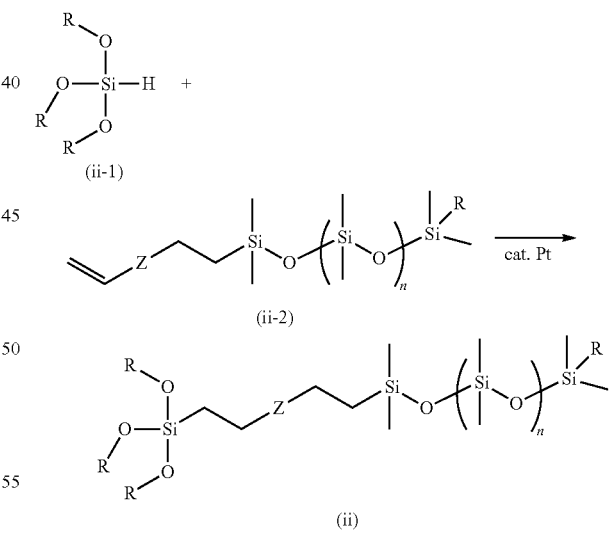

Electrophoretic Display Device

Next, the electrophoretic display device (the electrophoretic device of the embodiment of the invention) to which the electrophoretic sheet of the embodiment of the invention is applied will be described below.

Figure 9:
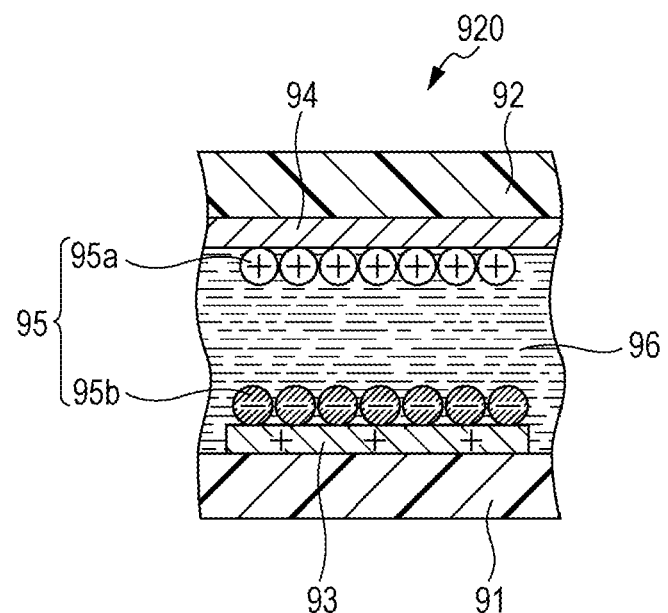
FIG. 9 is a schematic diagram illustrating an operating principle of the electrophoretic display device illustrated in FIG. 8.
Figure 10:
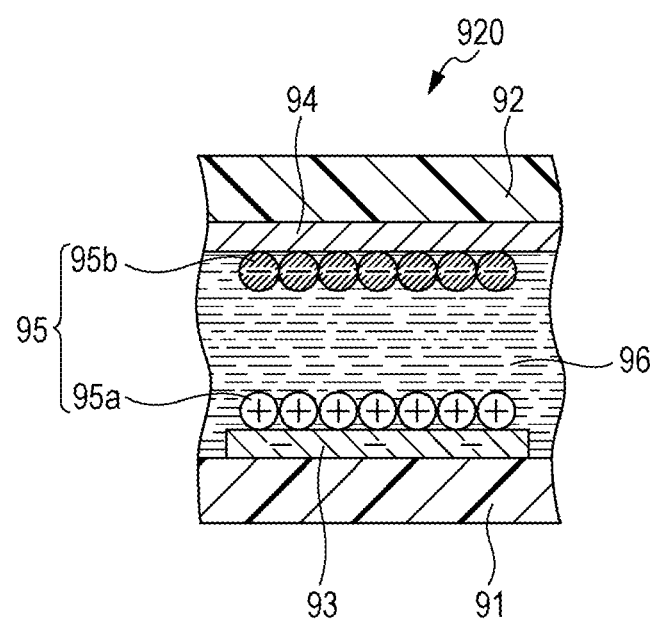
FIG. 10 is a schematic diagram illustrating an operating principle of the electrophoretic display device illustrated in FIG. 8.

FIG. 8 is a diagram for schematically illustrating a longitudinal cross section of the electrophoretic display device of the embodiment, and FIGS. 9 and 10 are schematic diagrams illustrating an operating principle of the electrophoretic display device illustrated in FIG. 8. Note that, in the following description, for the convenience of explanation, the upper side is described as "up" and the lower side is described as "low" in FIGS. 8 to 10.

The electrophoretic display device 920 illustrated in FIG. 8 includes an electrophoresis display sheet (front plane) 921, a circuit board (backplane) 922, an adhesive layer 981 which bonds the electrophoresis display sheet 921 and the circuit board 922, and a sealing portion 97 which air-tightly seals a gap between the electrophoresis display sheet 921 and the circuit board 922.

The electrophoresis display sheet (the electrophoretic sheet of the embodiment of the invention) 921 includes a substrate 912 which is provided with a flat base portion 92 and a second electrode 94 on the lower surface of the base portion 92, and a display layer 9400 which is provided on the lower surface (one surface) side of the substrate 912, and is formed of a partition wall 940 formed in a matrix shape and an electrophoretic dispersion liquid 910.

On the other hand, a circuit board 922 includes a counter substrate 911 which is provided with a flat base portion 91 and a plurality of first electrodes 93 on the upper surface of the base portion 91, a circuit (not shown) which is provided on the counter substrate 911 (the base portion 91), and includes a switching element such as a TFT, and a driving IC (not shown) for driving the switching element.

Hereinafter, the configuration of each portion will be sequentially described.

Each of the base portion 91 and the base portion 92 is formed of a sheet-like (flat) member, and has a function of supporting and protecting each member disposed between the base portion 91 and the base portion 92.

Each of the base portions 91 and 92 may be formed of a flexible material or a hard material; however, the flexible material is preferably used. With the base portions 91 and 92 having flexibility, it is possible to obtain the electrophoretic display device 920 having flexibility, that is, the electrophoretic display device 920 which is useful to construct the electronic paper.

In addition, in a case where each of the base portions (base material layers) 91 and 92 has the flexibility, the base portions 91 and 92 are preferably formed of a resin material.

The average thickness of each of the base portions 91 and 92 is appropriately set in accordance with a constituting material and an application. In addition, the average thickness thereof is not particularly limited, but is preferably in a range of 20 μm to 500 μm, and is further preferably in a range of 25 μm to 250 μm.

Each of the first electrode 93 and the second electrode 94 which are formed into a layer shape (a film shape) is provided on the surface of the base portions 91 and 92 on the partition wall 940 side, that is, on the upper surface of the base portion 91 and the lower surface of the base portion 92.

If the voltage is applied across the first electrode 93 and the second electrode 94, an electric field is generated therebetween, and thus the generated electric field acts on an electrophoretic particle 95.

In the embodiment, the second electrode 94 is set to be a common electrode, the first electrode 93 is set to be an individual electrode (a pixel electrode which is connected to the switching element) which is divided in a matrix shape, and a portion in which the second electrode 94 and one first electrode 93 are overlapped with each other constitutes one pixel.

The constituting material of each of the electrodes 93 and 94 is not particularly limited as long as the material substantially has conductivity.

The average thickness of such electrodes 93 and 94 is appropriately set in accordance with a constituting material and an application. In addition, the average thickness thereof is not particularly limited, but is preferably in a range of 0.05 μm to 10 μm, and is further preferably in a range of 0.05 μm to 5 μm.

Further, in each of the base portions 91 and 92, and each of the electrodes 93 and 94, each of the base portion and the electrode (in the embodiment, the base portion 92 and the second electrode 94) which are disposed on the display surface side has light transmittance, that is, the base portion and the electrode are substantially transparent (colorless and transparent, colored transparent, or semi-transparent).

In the electrophoresis display sheet 921, the display layer 9400 is provided in a state of coming in contact with the lower surface of the second electrode 94.

The display layer 9400 is accommodated (sealed) in a plurality of pixel spaces 9401 in which the electrophoretic dispersion liquid (the electrophoretic dispersion liquid of the embodiment of the invention described above) 910 is defined by the partition wall 940.

The partition wall 940 is formed between the counter substrate 911 and the substrate 912 so as to divide the pixel spaces in a matrix shape.

Examples of the constituting material of the partition wall 940 include various types of resin materials such as a thermoplastic resin such as an acrylic resin, a urethane resin, and an olefin resin, a thermosetting resin such as an epoxy resin, a melamine resin, and a phenolic resin. These may be used alone or in combination of two or more types thereof.

In the embodiment, the partition wall 940 is bonded to the second electrode 94 via an adhesive layer 982, and thus the partition wall 940 is fixed onto the substrate 912.

In the embodiment, the electrophoretic dispersion liquid 910 which is accommodated in the pixel space 9401 is formed by dispersing (suspending) two types particles (at least one type of the electrophoretic particles 1) which are coloring particles 95b and white particles 95a in the dispersion medium 96, and the electrophoretic dispersion liquid of the embodiment of the invention described above is applied thereto.

In such an electrophoretic display device 920, if the voltage is applied across the first electrode 93 and the second electrode 94, an electric field is generated therebetween, and thus the coloring particles 95b and the white particles 95a (the electrophoretic particle 1) are electrophoretically moved toward any one of the first electrode 93 and the second electrode 94.

In the embodiment, the positively charged white particles 95a and the negatively charged coloring particles (black particles) 95b are used. That is, as the white particle 95a, the electrophoretic particle 1 in which the base particle 2 is positively (plus) charged is used, and as the coloring particle 95b, the electrophoretic particle 1 in which the base particle 2 is negatively (minus) charged is used.

In a case where the aforementioned electrophoretic particles 1 are used, in a case where the first electrode 93 is set to be a negative potential, as illustrated in FIG. 10, the coloring particles 95b are moved to the second electrode 94 side so as to be collected in the second electrode 94. On the other hand, the white particles 95a are moved to the first electrode 93 side so as to be collected in the first electrode 93. For this reason, in a case where the electrophoretic display device 920 is viewed from above (display surface side), the color of coloring particles 95b can be seen, that is, a black color can be seen.

In contrast, if the first electrode 93 is set to be a positive potential, as illustrated in FIG. 9, the coloring particles 95b are move to the first electrode 93 side so as to be collected in the first electrode 93. On the other hand, the white particles 95a are moved to the second electrode 94 side so as to be collected in the second electrode 94. For this reason, in a case where the electrophoretic display device 920 is viewed from the above (the display surface side), the color of the white particles 95a can be seen, that is, a white color can be seen.

With such a configuration, the amount of charging the white particles 95a and the coloring particles 95b (the electrophoretic particle 1), the polarity of each of the electrodes 93 and 94, and the potential difference between electrodes 93 and 94 are appropriately set, and thus in accordance with a combination of colors of the white particles 95a and the coloring particles 95b, or the number of particles collecting in the electrodes 93 and 94, desired information (images) is displayed on the display surface of the electrophoretic display device 920.

In addition, a specific gravity of the electrophoretic particle 1 is preferably set to be substantially the same as a specific gravity of the dispersion medium 96. With this, the electrophoretic particle 1 can stay at a certain position for a long period of time in the dispersion medium 96 even after stopping the application of a voltage across the electrodes 93 and 94. That is, the information displayed on the electrophoretic display device 920 can be held for a long period of time.

Note that, the average particle size of the electrophoretic particle 1 is preferably in a range of 0.1 μm to 10 μm, and is further preferably in a range of 0.1 μm to 7.5 μm. When the average particle size of the electrophoretic particle 1 is set to be in the above-described range, it is possible to reliably prevent the electrophoretic particles 1 from being aggregated each other, and from being precipitated in the dispersion medium 96. As a result, it is possible to preferably prevent the display quality of the electrophoretic display device 920 from being deteriorated.

In the embodiment, the electrophoresis display sheet 921 and the circuit board 922 are bonded to each other via the adhesive layer 981. With this, the electrophoresis display sheet 921 and the circuit board 922 can be more reliably fixed to each other.

The average thickness of the adhesive layer 981 is not particularly limited, but is preferably in a range of 1 μm to 30 μm, and is further preferably in a range of 5 μm to 20 μm.

The sealing portion 97 is provided between the base portion 91 and the base portion 92, and specifically, the sealing portion 97 is provided along the edge portion of the base portion 91 and the base portion 92. The electrodes 93 and 94, the display layer 9400, and the adhesive layer 981 are air-tightly sealed by the sealing portion 97. With this, it is possible to prevent water from entering the electrophoretic display device 920, and more reliably prevent the display performance of the electrophoretic display device 920 from being deteriorated.

As the constituting material of the sealing portion 97, the same materials as those which are exemplified as the constituting material of the aforementioned partition wall 940 can be used.

Electronic Apparatus

Next, the electronic apparatus of the embodiment of the invention will be described.

The electronic apparatus of the embodiment of the invention is provided with the above-described electrophoretic display device 920.

Electronic Paper

First, an embodiment of a case where the electronic apparatus of the embodiment of the invention is applied to an electronic paper will be described.

Figure 11:
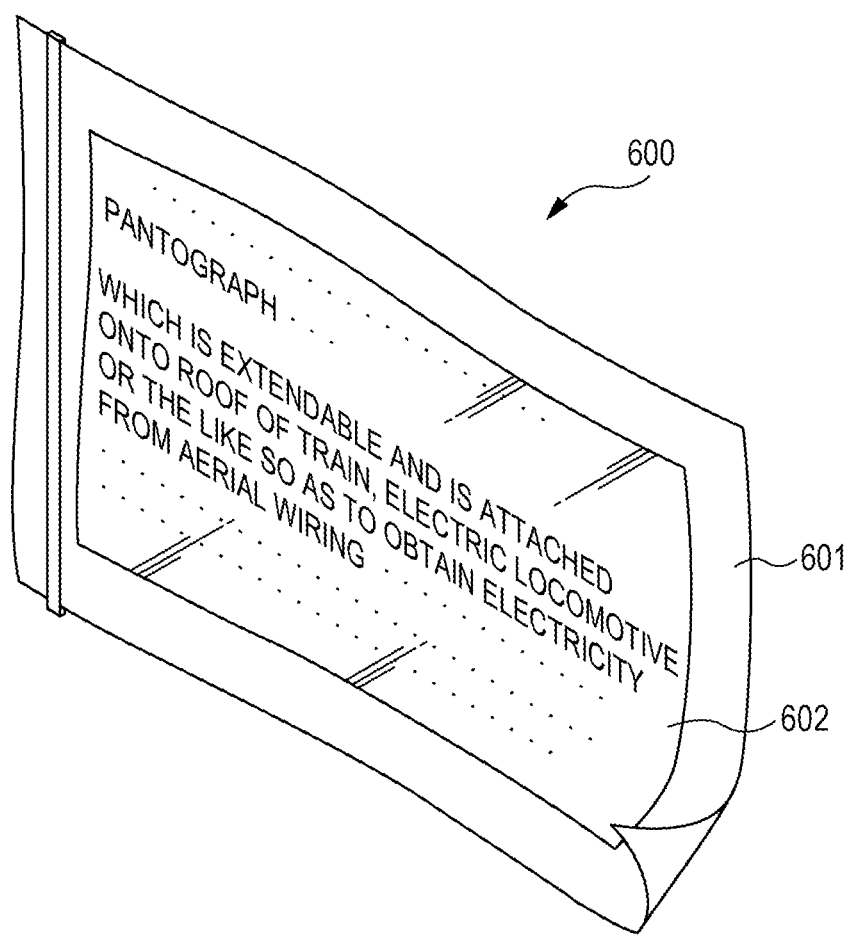
FIG. 11 is a perspective view illustrating an embodiment in a case where an electronic apparatus of the invention is applied to an electronic paper.

FIG. 11 is a perspective view illustrating an embodiment in a case where the electronic apparatus of the embodiment of the invention is applied to the electronic paper.

The electronic paper 600 illustrated in FIG. 11 is provided with a main body 601, which is formed of a rewritable sheet having the same texture and flexibility as those of paper, and a display unit 602.

In such an electronic paper 600, the display unit 602 is formed of the above-described electrophoretic display device 920.

Display

Next, an embodiment in a case where the electronic apparatus of the embodiment of the invention is applied to the display will be described below.

Figure 12:
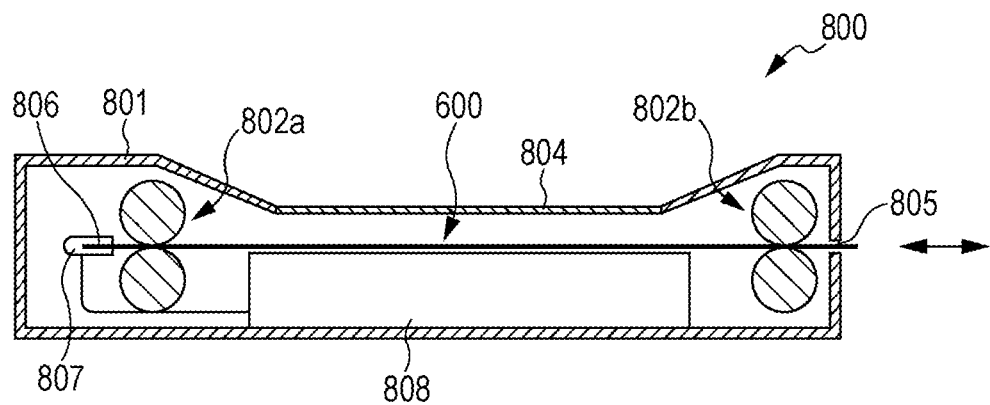
FIG. 12 is a diagram illustrating an embodiment in a case where the electronic apparatus of the invention is applied to a display.
Figure 13:
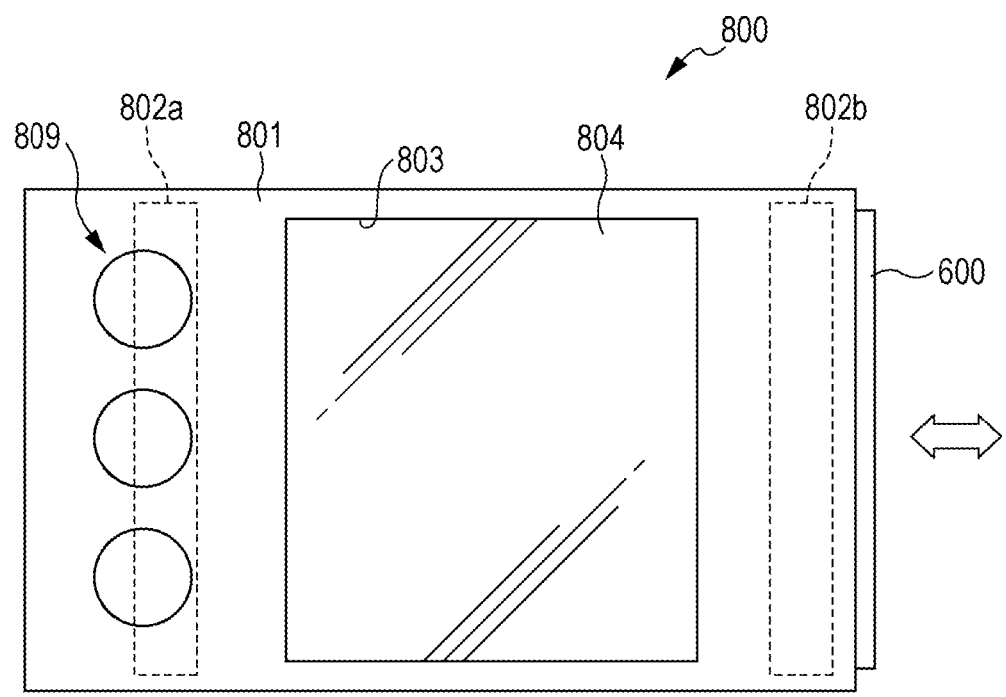
FIG. 13 is a diagram illustrating an embodiment in a case where the electronic apparatus of the invention is applied to a display.

FIGS. 12 and 13 are diagrams illustrating an embodiment in a case where the electronic apparatus of the embodiment of the invention is applied to a display. FIG. 12 is a sectional view and FIG. 13 is a plan view.

A display (a display device) 800 illustrated in FIGS. 12 and 13 is provided with a main body portion 801 and the electronic paper 600 which is detachably provided with respect to the main body portion 801.

In the main body portion 801, an insertion port 805 which can be inserted into the electronic paper 600 is formed in a side portion (the right side in FIG. 12), and two pairs of transport rollers 802a and 802b are provided thereinside. When the electronic paper 600 is inserted into the main body portion 801 via an insertion port 805, the electronic paper 600 is installed on the main body portion 801 in a state being interposed between the pair of transport rollers 802a and 802b.

In addition, a rectangular hole portion 803 is formed on the display surface side (the front side of the paper in FIG. 13) of the main body portion 801, and a transparent glass plate 804 is fitted into the hole portion 803. With this, it is possible to visually recognize the electronic paper 600 in a state of being installed in the main body portion 801 from the outside of the main body portion 801. That is, in the display 800, a display surface is formed in such a way that the electronic paper 600 in the state of being installed in the main body portion 801 is visually recognized in the transparent glass plate 804.

In addition, a terminal portion 806 is provided at a tip end portion (the left side in FIG. 12) of the electronic paper 600 in an insertion direction, and a socket 807 which is connected to the terminal portion 806 is provided in the main body portion 801 in the state where the electronic paper 600 is installed in the main body portion 801. A controller 808 and an operation unit 809 are electrically connected to the socket 807.

In such a display 800, the electronic paper 600 is detachably installed in the main body portion 801, and can be portably used in a state of being detached from the main body portion 801.

In addition, in such a display 800, the electronic paper 600 is formed of the above-described electrophoretic display device 920.

Note that, the application of the electronic apparatus of the embodiment of the invention is not limited to the above description; for example, application examples thereof include a television, a view finder type or a monitor direct view type video tape recorder, a car navigation device, a pager, an electronic organizer, an electronic calculator, an electronic newspaper, a word processor, a personal computer, a workstation, a television telephone, a POS terminal, and a device provided with a touch panel, and it is possible to apply the electrophoretic display device 920 to the display portion of the aforementioned various electronic apparatuses.

As described above, the method of manufacturing electrophoretic particle, the electrophoretic particle, the electrophoretic dispersion liquid, the electrophoretic sheet, the electrophoretic device, and the electronic apparatus of the embodiment of the invention are described with reference to embodiments illustrated in the drawings; however, the invention is not limited thereto, and the configuration of each portion can be replaced with any other configuration having the same function. In addition, other components may be added to the invention.

Further, the method of manufacturing an electrophoretic particle of the embodiment of the invention may additionally have one or two or more steps for a certain purpose.

EXAMPLES

Next, specific examples will be described below.

Manufacturing of Electrophoretic Particle,
Preparing of Electrophoretic Dispersion Liquid, and
Evaluation of Electrophoretic Dispersion Liquid Example 1

1. Synthesizing of Block Copolymer by Polymerization

In a flask, 6.2 g of 2-cyano-2-propyl benzo dithioate, and 600 mg of azobisisobutyronitrile were added into 100 g of terminal hydroxyl group silicone having the molecular weight of 16,000 ("SILAPLANE FM-0426", manufactured by JNC Filter Co., Ltd.; silicone macromonomer), the mixture was substituted with nitrogen, 100 mL of ethyl acetate was added into the mixture, thereafter, the mixture was heated and stirred for one hour at 75° C., 7.2 g of 3-methacryloxypropyl triethoxy silane ("KBE-503", manufactured by Shin-Etsu Silicones) was added into the mixture, and then the mixture was heated and stirred again for three hours at 75° C. so as to carry out the polymerization. The reaction is finished by cooling the resultant up to room temperature, and then the solvent was removed so as to obtain a block copolymer in which the dispersion portion and the bonding portion are bonded to each other.

In addition, the content of the unreacted product which is considered to remain in the obtained block copolymer at the time of obtaining the terminal hydroxyl group silicone can be calculated by measuring the peak of methacrylic group by using $^1$H-NMR ("500NB", manufactured by Varian, Inc), and the value of the peak of methacrylic group was 30% by weight, and the content of the block copolymer was 70% by weight.

2. Adjustment of Electrophoretic Dispersion Liquid

An electrophoretic particle was obtained in such a manner that, in the flask, 10 g of block copolymer (raw material) obtained above and 60 g of titania particle ("CR90" manufactured by Ishihara Sangyo Kaisha, Ltd.) were added so as to prepare a mixture, after that, the mixture was subjected to an ultrasonic treatment for one hour, and the mixture was heated and stirred for four hours at 180° C. such that the block copolymer was bonded to the particle. A white electrophoretic dispersion liquid was obtained by removing unreacted block copolymer from the reacted solution, and then adding the obtained electrophoretic particle to "KF-96-2 cs" manufactured by Shin-Etsu Chemical Co., Ltd.

In addition, except that 60 g of titanium black particle ("SC13-MT" manufactured by Mitsubishi Materials Co., Ltd.) was used instead of the titania particle, a black electrophoretic dispersion liquid was obtained by using the same method as that in the above description.

Regarding each of the white and black electrophoretic particles contained in each of the white and black electrophoretic dispersion liquids, the coverage of the block copolymer which covers the base particle was measured by using a thermogravimetric analyzer ("TGA-1", METTLER TOLEDO Co., Ltd.), and each coverage of the block copolymer was 5.1% by weight with respect to 100% by weight of the base particle.

Comparative Example 1

The white and black electrophoretic dispersion liquids were obtained by using the same method as that in Example 1, except that a material, in which the silicone oil ("KF-96L-2cs", manufactured by Shin-Etsu Chemical Co., Ltd) is further added into the block copolymer obtained in Example 1 such that the content of the block copolymer becomes 60% by weight, was used as the raw material.

Regarding each of the white and black electrophoretic particles contained in each of the white and black electrophoretic dispersion liquids, the coverage of the block copolymer which covers the base particle was measured by using a thermogravimetric analyzer ("TGA-1", METTLER TOLEDO Co., Ltd.), and each coverage of the block copolymer was 3.2% by weight with respect to 100% by weight of the base particle.

3. Evaluation of Electrophoretic Dispersion Liquid
3-1. Evaluation of Particle Aggregation and Electrode Adhesiveness Regarding the electrophoretic dispersion liquids in Example and Comparative Example, particle aggregation and electrode adhesiveness were evaluated as follows.

Evaluation of Particle Aggregation

In other words, the black electrophoretic dispersion liquid and the white electrophoretic dispersion liquid in Example and Comparative Example were observed at 200-fold magnification by using a microscope.

As a result, if the aggregation of the electrophoretic particle was not recognized in the electrophoretic dispersion liquid, and the electrophoretic particles were almost evenly distributed in the electrophoretic dispersion liquid without irregularity, the evaluation was determined as A, if the aggregation of the electrophoretic particle was slightly recognized, but the electrophoretic particles were almost evenly distributed in the electrophoretic dispersion liquid and the irregularity was almost not found, the evaluation was determined as B, and if the aggregation of the electrophoretic particle was apparently recognized, and the electrophoretic particles are maldistributed in the electrophoretic dispersion liquid with irregularity, the evaluation was determined as C.

Evaluation of Electrode Adhesiveness

Two pieces of ITO deposition glass were disposed with a gap of 50 μm therebetween, then a voltage of 15 V was applied across electrodes in a state where the white electrophoretic dispersion liquid and the black electrophoretic dispersion liquid of Example and Comparative Example were added dropwise in the gap, and at that time, the existence of electrophoretic particles adhered to the electrode surface was observed at 200-fold magnification by using a microscope.

As a result, if the electrophoretic particles were not adhered onto the electrode surface in the electrophoretic dispersion liquid, the evaluation was determined as A, if the electrophoretic particles were slightly adhered onto the electrode surface in the electrophoretic dispersion liquid, and the adhesion of the particles on the electrode surface was eliminated due to the application of voltage, the evaluation was determined as B, and if the electrophoretic particles were apparently adhered onto the electrode surface in the electrophoretic dispersion liquid, and the adhesion of the particles on the electrode surface was not eliminated due to the application of voltage, the evaluation was determined as C.

The evaluation results are indicated in Tables 1 and 2.

3-2. Evaluation of Display Properties

In addition, regarding the electrophoretic dispersion liquid in Examples and Comparative Example, the evaluation of display properties was performed as follows.

Evaluation of Display Properties

First, regarding the electrophoretic dispersion liquid containing the white particle in Example 1 and Comparative Example 1, and the electrophoretic dispersion liquid containing the black particle in Example 1 and Comparative Example 1, the electrophoretic dispersion liquid containing the white particle and the black particle was prepared by combining the white particle and the black particle such that

TABLE 1

| Particle (white particle) | Block copolymer | | Content of block copolymer in dispersion liquid | Coverage of block copolymer with respect to particle | Evaluation | |
|---|---|---|---|---|---|---|
| | First monomer | Second monomer | | | Particle aggregation | Electrode adhesiveness |
| Example 1 | CR90 | 16k siloxane MA | KBE-503 | 70% by weight | 5.1% by weight | B | B |
| Comparative Example 1 | CR90 | 16k siloxane MA | KBE-503 | 60% by weight | 3.2% by weight | C | C |

TABLE 2

| Particle (black particle) | Block copolymer | | Content of block copolymer in dispersion liquid | Coverage of block copolymer with respect to particle | Evaluation | |
|---|---|---|---|---|---|---|
| | First monomer | Second monomer | | | Particle aggregation | Electrode adhesiveness |
| Example 1 | SC13-MT | 16k siloxane MA | KBE-503 | 70% by weight | 5.1% by weight | B | B |
| Comparative Example 1 | SC13-MT | 16k siloxane MA | KBE-503 | 60% by weight | 3.2% by weight | C | C |

As apparently indicated in Tables 1 and 2, in the electrophoretic dispersion liquids of the respective Examples, the aggregation of the electrophoretic particles in the black electrophoretic dispersion liquid and white electrophoretic dispersion liquid, and the adhesion of the electrophoretic particles to the electrode were appropriately suppressed, and thus it was found that the electrophoretic particles in the electrophoretic dispersion liquid exhibited the excellent dispersibility and the electrophoretic properties.

In contrast, in the electrophoretic dispersion liquid in Comparative Example, it was recognized that since the content of the block copolymer except for the particle in the mixture is less than 70% by weight, a sufficient amount of the block copolymer cannot be bonded with respect to the particle, and thus the electrophoretic particles are aggregated with each other in the electrophoretic dispersion liquid, and the electrophoretic particles are adhered to the electrode. As a result, it was found that the electrophoretic particles in the electrophoretic dispersion liquid were not excellent in the dispersibility and the phoretic properties (particularly, the dispersibility).

the volume ratio of the white electrophoretic dispersion liquid to the black electrophoretic dispersion liquid in the mixture is 10:1.

Then, a transparent electrode cell having the thickness of 50 μm was injected into the prepared electrophoretic dispersion liquid, and then white reflectance at the time of white display, and black reflectance at the time of black display were measured so as to calculate contrasts thereof.

The evaluation results are indicated in Table 3.

TABLE 3

| White electrophoretic dispersion liquid (Content of block copolymer) | Black electrophoretic dispersion liquid (Content of block copolymer) | White reflectance/ black reflectance |
|---|---|---|
| Example 1 (70% by weight) | Example 1 (70% by weight) | 45/3.2 |
| Example 1 (70% by weight) | Comparative Example 1 (60% by weight) | 38/4.1 |

TABLE 3-continued

| White electrophoretic dispersion liquid (Content of block copolymer) | Black electrophoretic dispersion liquid (Content of block copolymer) | White reflectance/ black reflectance |
|---|---|---|
| Comparative Example 1 (60% by weight) | Example 1 (70% by weight) | 37/4.5 |
| Comparative Example 1 (60% by weight) | Comparative Example 1 (60% by weight) | 34/5.1 |

As apparent from Table 3, in electrophoretic dispersion liquid obtained by combining the white particle in Example and the black particle in Example, the electrophoretic particle exhibited the excellent contrast, that is, display properties in the electrophoretic dispersion liquid between the white particle and the black particle without generation of the aggregation.

In contrast, in the electrophoretic dispersion liquid obtained by combining at least one of the white particle and the black particle in Comparative Example, since the content of the block copolymer except for the particle in the mixture is less than 70% by weight, a sufficient amount of the block copolymer cannot be bonded with respect to the particle, and thus the aggregation is generated between the white particle and the black particle. As a result, it was found that the contrast, that is, the display properties are deteriorated.

The entire disclosure of Japanese Patent Application No. 2015-235350, filed Dec. 2, 2015 is expressly incorporated by reference herein.

What is claimed is:

1. A method of manufacturing an electrophoretic particle which includes a particle, and a particle surface treatment agent which is bonded to the particle, the method comprising:
    preparing a mixture containing a plurality of the particles, the particle surface treatment agent, an unreacted product of a raw material used at the time of generating the particle surface treatment agent, and a reaction by-product generated at the time of generating the particle surface treatment agent, the mixture having a content of the particle surface treatment agent which is set to be equal to or greater than 70% by weight in the mixture except for the plurality of particles; and
    bonding the particle surface treatment agent to the particle in the mixture,
    wherein the particle surface treatment agent is a block copolymer which contains a dispersion portion which is formed by polymerizing first monomers and a bonding portion which is formed by polymerizing second monomers having a functional group, and is bonded to the particle when the functional group is reacted in the bonding portion, and
    wherein the first monomer is a silicone macromonomer expressed by the following Formula (I)

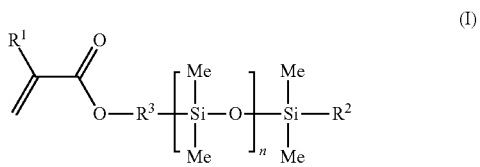

In the formula, $R^1$ represents a hydrogen atom or a methyl group, $R^2$ represents a hydrogen atom or an alkyl group having 1 to 4 carbon atoms, $R^3$ represents a structure including one of an alkyl group having 1 to 6 carbon atoms and an ether group of ethylene oxide or propylene oxide, and n represents an integer of 0 or greater].

2. The method of manufacturing an electrophoretic particle according to claim 1,
    wherein in the preparing of the mixture, a solvent for dissolving the particle surface treatment agent is not added into the mixture.

3. The method of manufacturing an electrophoretic particle according to claim 1,
    wherein weight-average molecular weight of each of the unreacted product and the reaction by-product is in a range of 1,000 to 50,000.

4. The method of manufacturing an electrophoretic particle according to claim 1,
    wherein the unreacted product and the reaction by-product are respectively an unreacted product of a raw material at the time of generating the first monomer and a reaction by-product at the time of generating the first monomer.

5. An electrophoretic particle made according to the method of claim 1
    wherein when a weight of the particle is set to be 100% by weight, the weight of the particle surface treatment agent is in a range of 4% by weight to 8% by weight.

6. An electrophoretic dispersion liquid comprising:
    the electrophoretic particle according to claim 5; and
    a dispersion medium.

7. An electrophoretic sheet comprising:
    a substrate; and
    a structure body which is provided on the substrate and accommodates the electrophoretic dispersion liquid according to claim 6.

8. An electrophoretic device comprising the electrophoretic sheet according to claim 7.

9. An electronic apparatus comprising the electrophoretic device according to claim 8.

* * * * *